United States Patent
De Sousa Bispo et al.

(10) Patent No.: US 11,762,763 B2
(45) Date of Patent: *Sep. 19, 2023

(54) ORCHESTRATION FOR AUTOMATED PERFORMANCE TESTING

(71) Applicant: Salesforce, inc., San Francisco, CA (US)

(72) Inventors: Mariano Edgardo De Sousa Bispo, Buenos Aires (AR); Ana Laura Felisatti, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,235

(22) Filed: Jan. 23, 2023

(65) Prior Publication Data

US 2023/0161694 A1 May 25, 2023

Related U.S. Application Data

(63) Continuation of application No. 16/838,167, filed on Apr. 2, 2020, now Pat. No. 11,561,889.

(51) Int. Cl.
*G06F 11/36* (2006.01)
*G06F 9/54* (2006.01)
*G06F 16/23* (2019.01)

(52) U.S. Cl.
CPC ......... *G06F 11/3688* (2013.01); *G06F 9/541* (2013.01); *G06F 11/3664* (2013.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 6,023,773 | A | * | 2/2000 | O'Donnell .......... G06F 11/2273 714/11 |
| 9,411,575 | B2 | * | 8/2016 | Walters ............... G06F 11/3692 |
| 9,692,811 | B1 | * | 6/2017 | Tajuddin ............. G06F 11/3616 |
| 2015/0339216 | A1 | * | 11/2015 | Wade ................... G06F 11/3664 714/38.1 |
| 2016/0306735 | A1 | * | 10/2016 | Adderly .................... G06F 8/65 |
| 2017/0277626 | A1 | * | 9/2017 | Murthy ............... G06F 11/3692 |

(Continued)

*Primary Examiner* — Philip Wang
(74) *Attorney, Agent, or Firm* — Holland & Hart LLP

(57) ABSTRACT

Methods, systems, and devices supporting orchestration for automated performance testing are described. A server may orchestrate performance testing for software applications across multiple different test environments. The server may receive a performance test indicating an application to test and a set of test parameters. The server may determine a local or a non-local test environment for running the performance test. The server may deploy the application to the test environment, where the deploying involves deploying a first component of the performance test to a first test artifact in the test environment and deploying a second component of the performance test different from the first component to a second test artifact in the test environment. The server may execute the performance test to obtain a result set, where the executing involves executing multiple performance test components as well as orchestrating results across multiple test artifacts to obtain the result set.

20 Claims, 11 Drawing Sheets

(56) References Cited

U.S. PATENT DOCUMENTS

| | | | |
|---|---|---|---|
| 2018/0321918 A1* | 11/2018 | McClory | H04L 41/5041 |
| 2019/0303272 A1* | 10/2019 | Sadykov | G06F 40/166 |
| 2020/0081814 A1* | 3/2020 | Srinivasan | G06F 8/71 |
| 2020/0250074 A1* | 8/2020 | Zhang | G06F 11/3664 |

* cited by examiner

ORCHESTRATION FOR AUTOMATED PERFORMANCE TESTING

CROSS REFERENCES

The present Application for Patent is a continuation of U.S. patent application Ser. No. 16/838,167 by De Sousa Bispo et al., entitled "ORCHESTRATION FOR AUTOMATED PERFORMANCE TESTING," filed Apr. 2, 2020, which is assigned to the assignee hereof and which is expressly incorporated by reference herein.

FIELD OF TECHNOLOGY

The present disclosure relates generally to data processing, and more specifically to orchestration for automated performance testing.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some cloud platforms—or other systems—may use performance testing to support the development and testing of software applications. Performance testing may occur in multiple different environments, and performance tests may be written by a performance team, which may be different from an application development team. In some cases, when a first team (e.g., an application development team) develops the software application and a second team (e.g., a performance team) tests the performance of the application, the second team may spend a significant amount of time determining how to properly test the performance of the application. In some cases, the tested performance of the application may be incorrect or inaccurate based on a disconnect between the performance team and the application development team. Additionally or alternatively, a test environment may be created manually by a user, which may increase the amount of time needed to setup the test environment, increase the number of errors present in the test environment, decrease the accuracy of the performance tests, or result in any combination of these deficiencies.

DETAILED DESCRIPTION

Figure 1:
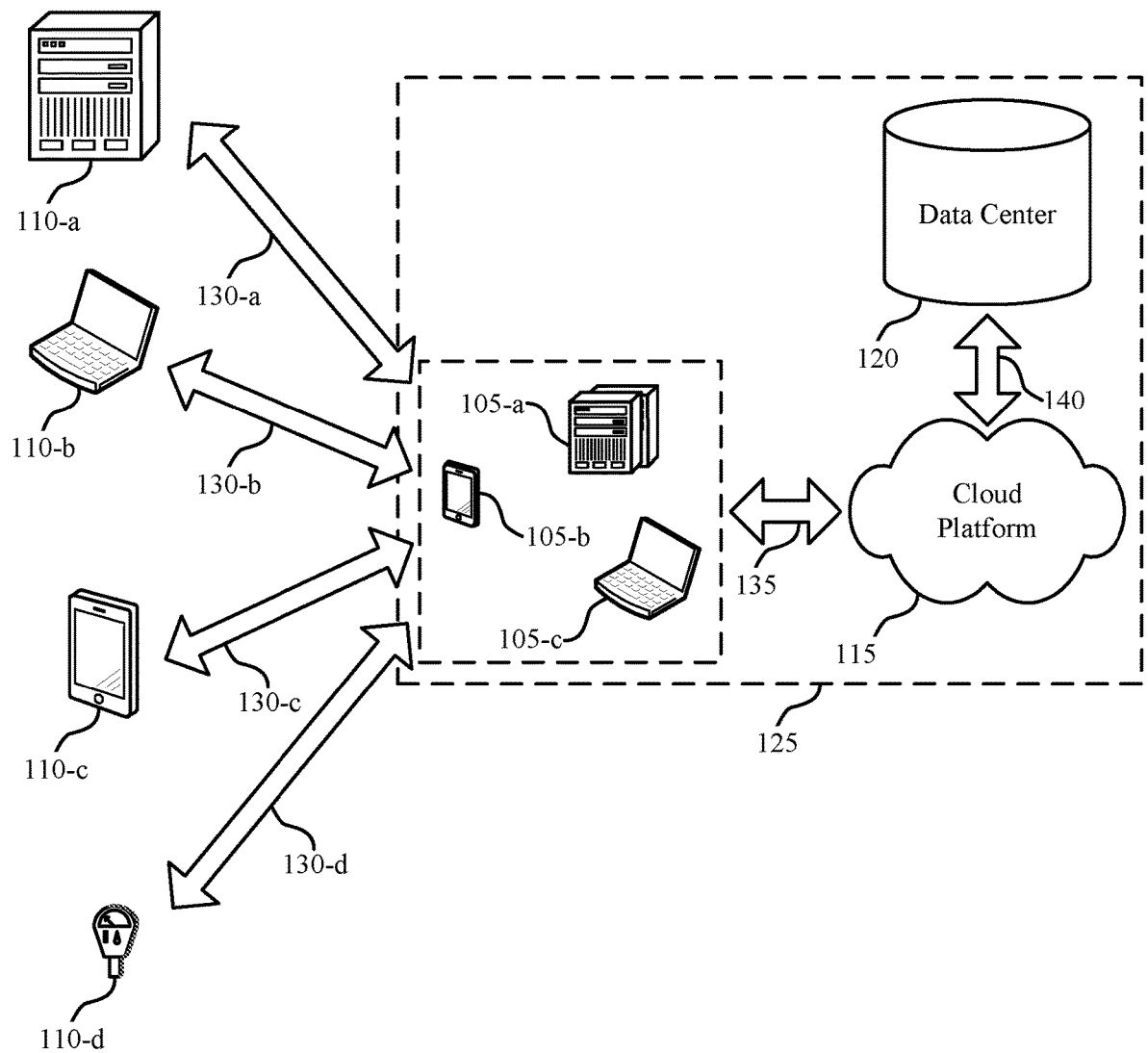
FIG. 1 illustrates an example of a system for software testing that supports orchestration for automated performance testing in accordance with aspects of the present disclosure.

Some systems (e.g., cloud platforms, database systems, application development systems, etc.) may use performance testing to support the development and testing of software applications. Performance testing may occur in multiple different environments to ensure the software application performs properly in the different environments. In some systems, a performance test may be written by a performance team, and the performance team may be different from an application development team developing the software application. In some cases, when a first team (e.g., an application development team) develops the software application and a second team (e.g., a performance team) tests the performance of the application, the second team may spend a significant amount of time determining how to properly test the performance of the application. In some cases, the tested performance of the application may be incorrect or inaccurate based on a disconnect between the teams or an incomplete understanding of the application by the performance team. However, the application development team may not possess the domain knowledge or tools necessary to reliably test the performance of the application. Additionally or alternatively, a user may create a test environment manually, which may result in significant human error associated with the test environment.

A performance testing system may implement orchestration for automated performance testing. A test orchestrator may reduce testing time, identify performance bottlenecks, and improve system performance (e.g., as compared to a user-defined performance test or other automated performance testing systems). A server (e.g., an orchestration server, an execution engine, etc.) may receive a performance test indicating an application to test and a set of test parameters, and the server may determine a test environment for running the performance test. In some examples, the server may receive an indication of a test environment, and the server may create (e.g., instantiate) the test environment based on the indication. In some additional or alternative examples, the test environment may already exist, and credentials and/or a location associated with the test environment may be received by the server. The server may deploy the application to the test environment. For example, the server may deploy a first component of the performance test to a first artifact in the test environment and a different component of the performance test to a second test artifact in the test environment. An artifact may be a software or hardware component that supports the performance testing of a software application. The server may execute the performance test and orchestrate across different artifacts and/or environments to obtain a result set, where the result set may indicate one or more performance metrics associated with the performance test. In some cases, a performance metric may identify a performance bottleneck, alerting users to the bottleneck and thereby supporting the resolution of such performance bottlenecks.

The server may facilitate the testing of an application in multiple different test environments. For example, the server may dynamically determine a first test environment and a second test environment. In some cases, the server may execute a performance test in the first test environment and the second test environment. In some examples, the first test environment may be a local test environment (e.g., a virtual environment), and the second test environment may be a non-local environment (e.g., running on one or more machines external to the server orchestrating the performance test). For example, the local test environment may be used to debug the software application and/or identify performance bottlenecks, and the non-local environment may be used to ensure application compatibility in different environments. Executing the performance test in multiple test environments may ensure the reliability and compatibility of the software application in multiple environments, thereby improving system performance.

Aspects of the disclosure are initially described in the context of an environment supporting an on-demand database service. Aspects of the disclosure are further described with respect to a performance testing system, a system architecture, and a number of process flows. Aspects of the disclosure are further illustrated by and described with reference to apparatus diagrams, system diagrams, and flowcharts that relate to orchestration for automated performance testing.

FIG. 1 illustrates an example of a system 100 for software testing that supports orchestration for automated performance testing in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the data center 120 may include multiple databases, software repositories, servers, or other types of systems. For example, the data center 120 or cloud platform 115 may include an orchestration server (e.g., an execution engine). In some cases, the orchestration server may support orchestration for automated performance testing. The cloud platform 115 or an application server of subsystem 125 may receive a performance test from a user device, and the performance test may indicate an application to test and a set of test parameters. The user device may be an example of a cloud client 105 or a contact 110. The orchestration server may determine a test environment for running the performance test, and the orchestration server may deploy the application to the test environment. The orchestration server may execute the performance test to obtain a result set, where executing the performance test may include performing a first isolated execution and a second isolated execution based on the test parameters, as well as orchestrating results across a first test artifact and a second test artifact to obtain a result set. Orchestration for automated performance testing may reduce testing time and support the identification of performance bottlenecks.

In some other systems, a user operating a performance testing system may fail to sufficiently test the performance of a software application for one or more reasons. For example, the user may not be associated with developing the software application and, as such, may study the software application to try to determine how it should be tested, create a number of performance tests, and create a number of test environments. The performance tests and/or test environments may fail to adequately test the performance of the software application, and in some cases, may yield inaccurate performance metrics. In some examples, the performance tests may fail to test the performance of critical aspects of the software application, thereby yielding inaccurate performance metrics. In some additional or alternative examples, the user may fail to create a test environment that the application may be deployed to, so the application's performance in the environment may be unknown. In some cases, a performance bottleneck may be associated with the environment, and a performance bottleneck may degrade user experience or make the application inoperable. However, based on a disconnect between a performance team and an application development team, the users in charge of fixing such a bottleneck may not understand the performance testing and, as such, may fail to effectively address each potential bottleneck. In some additional or alternative cases, a performance bottleneck may be exploitable by a malicious user (e.g., a hacker), which may degrade system performance and security.

Specifically, in some such other systems, a performance engineer may set up the environment in which to run a test (e.g., despite not having a full understanding of the software application). For example, the performance engineer may handle all instances (e.g., servers, runtimes, etc.) and tests related to code performance. A developer may indicate a test to run, a load for the system, an application to test, a job configuration file, or some combination of these, and may add the job to a queue for the performance team. The performance team may in turn review the information and set up a runtime, create a load, process results, and return results to the developer based on this indicated information. Depending on the performance team's queue, these performance results may take a significant amount of time to generate. Additionally, if the developer updates the code, the developer may resubmit all of the information again, and the performance team may download all of the relevant code again. In some cases, maintaining an up-to-date code repository may be difficult, as the repository may include a large number of binary files and downloading the latest version may use a significant amount of processing resources. Additionally, the performance engineer may not be able to easily identify a specific patch or file needed to bring a software application up-to-date for performance testing. Furthermore, the performance tests configured by the performance engineer may reside in a different repository than the software application code that the performance tests are testing, causing potential delay and other inefficiencies associated with performing the tests.

In contrast, the system 100 may implement orchestration for automated performance testing, which may reduce testing time, identify performance bottlenecks, and improve system performance. For example, an application server of subsystem 125 may receive a performance test from a cloud client 105 or contact 110 (e.g., defined by a software developer using a set of APIs defined for the performance infrastructure), and the performance test may indicate an application to test and a set of test parameters. The application server may determine a test environment for running the performance test. In some cases, the application server may determine and/or build the test environment based on the set of test parameters. The application server may determine multiple test environments based on the set of test parameters, and the application server may execute the performance test in the multiple test environments. Building the test environments in a programmatic fashion by the application server may improve test environment reliability, and executing the performance test in the multiple test environments may support the identification of performance bottlenecks. In some cases, executing the performance test in multiple test environments may support the generation of performance metrics that accurately reflect the performance of the application. Furthermore, the system 100 may support application development teams providing test parameters to effectively test a software application's performance (e.g., without performance engineers manually building the specific frameworks for testing the performance). As such, the system 100 may support a user effectively initiating the proper performance tests without requiring the user to possess extensive domain knowledge in performance testing and environment building.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Users of computing and cloud platforms may run performance tests to measure the performance of a software application in one or more environments. For example, when a software application is updated to include a new feature, the performance of the software application may be tested to identify performance bottlenecks (e.g., high memory usage, high system latency, high compute resources, etc. with regard to one or more performance thresholds) and/or to ensure the software application meets an expected level of performance (e.g., an application load time, an application latency, etc.). In some additional or alternative cases, a user may manually define and build a number of test environments, which may increase system errors and build time. A system supporting orchestration for automated performance testing may build test environments in a programmatic fashion or identify pre-built test environments, thereby reducing system errors and build time.

The performance testing framework described herein may provide abstractions of performance testing assets for use by software developers. For example, the framework may abstract the environment in which a test is run and a test type. The test types may include a soak test (e.g., testing an application with a typical production load over a continuous availability period), a transaction per second (TPS) test (e.g., determining a number of supported transaction executions per second for the application), a burst test (e.g., testing how the application handles a sudden spike in usage), a heavy load test (e.g., testing how the application handles heavy load volumes for extended amounts of time), or any other performance test type. The performance testing framework may include one or more application programming interfaces (APIs) allowing a user to define a load for a performance test, how dependencies are hooked up, how results are gathered and presented, or some combination thereof. The performance testing framework may implement a number of APIs, where the framework orchestrates information between these APIs. Each API described herein may support multiple implementations (e.g., depending on the environment represented by the API).

The performance testing framework may support thorough performance testing by both configuring the system to be tested and accurately mocking—or externally calling—any external dependencies for testing. For example, to validate the performance of a web page which depends on a database (e.g., data center 120), the system may use database resources or may mock the database execution to accurately simulate latency associated with the database dependency. Furthermore, the web page may receive different loads (e.g., a specific payload or a custom header), run on different platforms, operate in different environments, etc. To properly validate the performance of the web page, the performance testing framework may validate the web page's performance across all valid scenarios in all valid environments.

Figure 2:
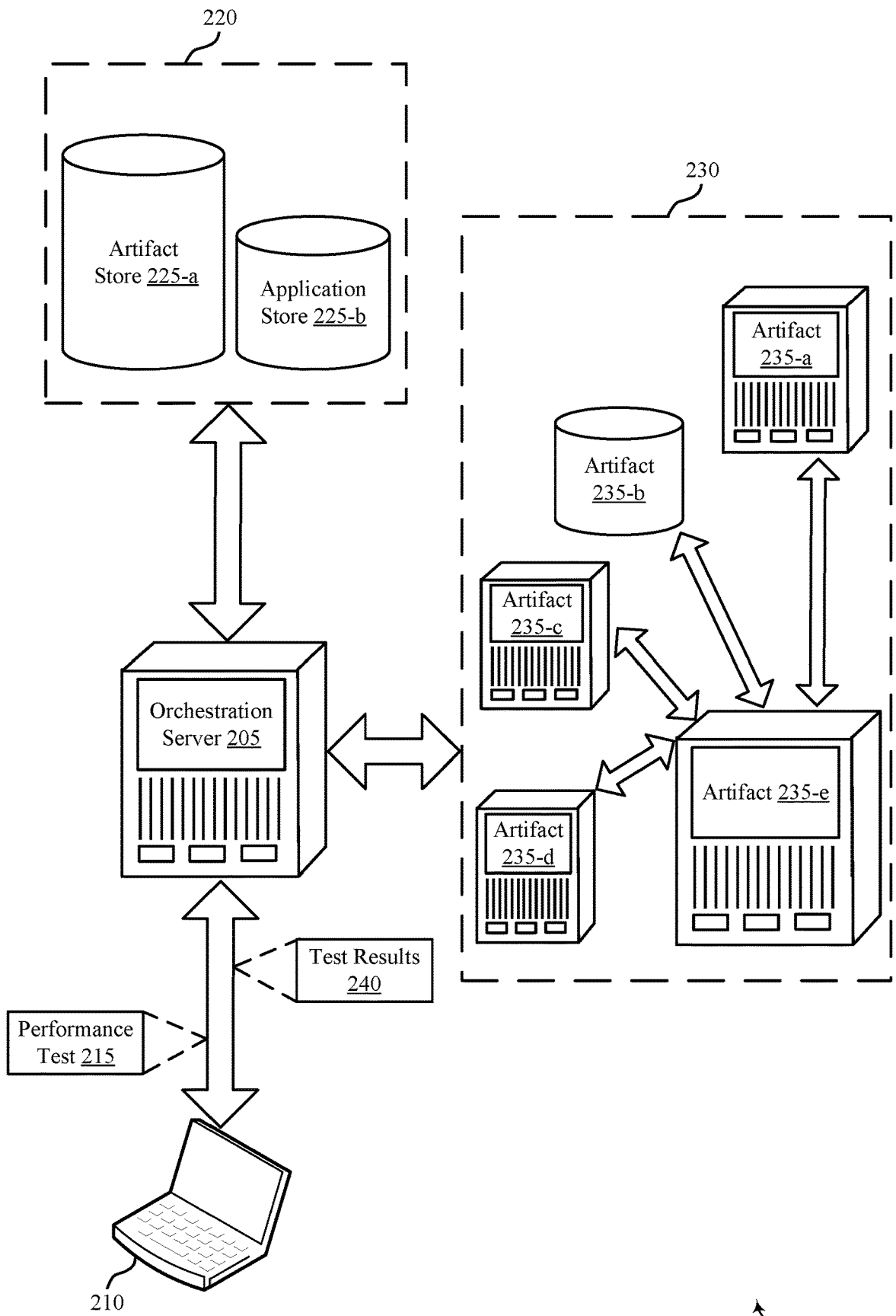
FIG. 2 illustrates an example of a performance testing system that supports orchestration for automated performance testing in accordance with aspects of the present disclosure.

FIG. 2 illustrates an example of a performance testing system 200 that supports orchestration for automated performance testing in accordance with aspects of the present disclosure. The performance testing system 200 includes an orchestrator (e.g., an orchestration server 205), a user device 210, a data store 220 that may include artifact store 225-a and/or application store 225-b, and a test environment 230 that may include a number of artifacts 235. The system 200 may implement aspects of a system 100 as described with reference to FIG. 1. For example, an orchestration server 205, artifact store 225-a, application store 225-b, or artifact 235 may be an example or component of a data center 120 or subsystem 125. The performance testing system 200 may provide a performance testing framework (e.g., for integration solutions).

The orchestration server 205 may represent aspects of an application server, communication server, data processing server, database server, cloud-based server, server cluster, virtual machine, container, or some similar data processing device or system. The orchestration server 205 may communicate with other devices such as the data store 220, the test environment 230, or a number of artifacts 235 of the test environment 230 (e.g., via one or more APIs). The orchestration server 205 may receive a performance test 215 indicating an application to test and a set of test parameters from a user device 210. In some cases, the orchestration server 205 may retrieve the application from application store 225-b. In some additional or alternative cases, the orchestration server 205 may identify or retrieve one or more artifacts 235 from artifact store 225-a. The artifacts 235 may be associated with test components that may be used in the performance testing of the application. In some examples, the application may be associated with a number of dependencies, and the artifacts may support the dependencies. For example, the application may be associated with a database (e.g., a relational database, a non-relational database, etc.) dependency and a proxy server (e.g., a Hypertext Transfer Protocol (HTTP) server, a Web Server Gateway Interface (WSGI) server, etc.) dependency, and the orchestration server 205 may retrieve a first artifact from artifact store 225-a to support the database dependency and a second artifact from artifact store 225-b to support the proxy server dependency. The orchestration server 205 may improve test reliability by supporting or maintaining artifact dependencies.

The orchestration server 205 may determine a test environment 230 for running the performance test. In some cases, the test environment 230 may be based on the set of test parameters indicated in the performance test 215. The orchestration server 205 may identify and/or retrieve a number of artifacts 235 from artifact store 225-a. The performance testing system 200 may support the publishing of new, updated, or custom artifacts 235. In some examples, a user associated with user device 210 may create a new artifact 235 and publish the new artifact 235 to artifact store 225-a. The new artifact may be used by multiple users and/or in multiple performance tests, thereby reducing test time. For example, the user may create a new artifact (e.g., a new database, a new proxy server, a new application runtime, etc.), and the user may publish the new artifact to artifact store 225-a. Publishing new artifacts to artifact store 225-a may facilitate the usage of new or custom artifacts, which may thereby support generating accurate performance metrics for software applications in a dynamic software ecosystem.

The orchestration server 205 may deploy the application to the test environment 230. In some cases, deploying the application may include deploying a first component of the performance test to a first artifact 235 and deploying a second component of the performance test different from the first component to a second test artifact 235. For example, artifact 235-a may correspond to the first artifact, and artifact 235-a may be supported by or otherwise associated with a proxy server. An HTTP proxy server may correspond to the first component, and the HTTP proxy server may run a performance test for the first component based on the artifact 235-a. In some cases, a number of policies may be applied to an artifact 235 or a component associated with an artifact 235. For example, a policy applied to artifact 235-a may define a security policy, optional or required parameters, a timeout duration, or the like.

In some cases, artifact 235-e may correspond to a test environment setup orchestrator (e.g., using a session API). Artifact 235-e may improve system reliability by coordinating the setup of the test environment 230. In some other cases, the orchestration server 205 may itself act as the test environment setup orchestrator. In some examples, artifact 235-a may be associated with a proxy server, artifact 235-b may be associated with a database, artifact 235-c may be associated with a runtime environment, artifact 235-d may be associated with a load generator, and artifact 235-e may be associated with—or otherwise support—a session API. In some examples, the proxy server may forward requests to the runtime environment, and the runtime environment may be configured dynamically. For example, the runtime environment may expose a port for receiving requests, the session API may obtain or determine a port number that corresponds to the exposed port and indicate the port number to the proxy server, and the proxy server may forward requests to the port number. As such, the session API may facilitate the reliable building of a dynamic test environment 230.

The orchestration server 205 may execute the performance test 215 in the test environment 230 to obtain test results 240 (e.g., a results set). In some cases, the orchestration server 205 may orchestrate results across a first test artifact and a second test artifact to obtain the test results 240. Additionally or alternatively, the orchestration server 205 may determine whether or how to execute the performance test 215 in the test environment 230 based on the session API. The orchestration server 205 may execute or initiate the execution of the performance test 215, and the orchestration server 205 may obtain test results 240 based on the execution. For example, artifact 235-*b* may store or produce request information (e.g., a number of successful requests, a number of failed requests, a number of read requests, a number of write requests, etc.) associated with the execution of the performance test 215, and the orchestration server 205 may generate performance metrics based on the request information. In some cases, the performance metrics may include a number of errors, a number of successful requests, a measure of latency, an average response time, or the like.

In response to a performance test 215 request received from a user device 210, the orchestration server 205 may send the test results 240—or at least a portion of the test results 240—to the user device 210 for display in a user interface. A user triggering the performance test 215 may analyze the test results 240 to determine how a software application performs in one or more environments. Additionally or alternatively, the user may determine one or more performance bottlenecks in running the software application. Based on this information, the user may modify the software application to improve performance (e.g., in a particular environment, to avoid a specific bottleneck, etc.).

In some cases, the performance testing system 200 may support a number of execution environments (e.g., a runtime environment or other node for implementing one or more portions of an execution model), docker images (e.g., a file, including multiple layers, that may execute code—such as code in a docker container—and may be built from the instructions for the executable version of a software application), or both. In some examples, the performance testing system 200 may include an execution environment for each runtime deployment option, where the environments are configured to support consistent results for each environment and across environments (e.g., such that accurate analysis can be performed across execution environments). Additionally or alternatively, the performance testing system 200 may include a docker image for each external service used for performance testing. These docker images may be associated with descriptors for their configurations and underlying execution environments for the docker images. Furthermore, in some cases, the performance testing system 200 may provide and maintain a local execution tool for users (e.g., to run at a user device 210 or locally at a single server or cluster).

The performance testing system 200 may manage all performance assets such that the performance assets may be accessed and used by software application developers (e.g., based on indicating a specific set of test parameters in a testing file). The performance assets may include one or more test environments 230, one or more test cases, one or more backends (e.g., backend servers, backend systems, etc.), security assets, or any combination thereof. The performance testing system 200 may further manage APIs and data flows, supporting exposing APIs to users, validating input data to APIs, validating the availability of APIs or other platforms, integration with computing services (e.g., cloud computing services), integration with database systems, or any combination of these or other supported API functions.

In some examples, the performance testing system 200 may support both performance testing automation and automated results analysis. The performance testing automation may support continuous integration pipelines, data processing pipelines, integrating separate code repositories, uploading artifacts 235, migrating bash scripts, dashboard implementations, log file parsing (e.g., to create a generic implementation of a log file that stores any metric in a key-value format), or any combination of these features. In some cases, the performance testing system 200 may support a troubleshooting mode for performance testing, which may include tools for memory tracking, profiling, threads and/or memory snapshots, or the like. Automated analysis may include analyzing data quality, collecting data logs, exploring log files (e.g., supporting visibility for an error log, error types, and error rate and storing log file sizes for analysis), detecting performance anomalies (e.g., performance metrics below some outlier threshold metric or above some outlier threshold metric), anomaly handling, correlating between performance metrics, self-benchmarking, or any combination of these analysis procedures. Additionally or alternatively, the performance testing system 200 may perform time-series based analysis, statistical analysis, performance tracking, or some combination thereof. Time-series based analysis may analyze performance test results to address results consistency, for example, by analyzing results variability over time for the duration of the performance test, identifying outliers, and performing automated root-cause analysis on the identified outliers. Statistical analysis may involve determining descriptive statistics, data distributions, or both based on the performance test results. Performance tracking may involve automatically tracking performance regressions and performance improvements across associated runtime versions, build numbers, repository changes between versions, users updating the code, or any combination thereof.

The performance testing system 200 may support one or more results dashboards. For example, the user device 210 may display a results dashboard in a user interface. In some examples, the dashboards may include an overview dashboard presenting a results overview with high-level results and an indication of the test configuration and a detailed dashboard presenting performance test behavior over time. Additionally or alternatively, the dashboards may include a control dashboard, a runtime dashboard, or an integrated control-and-runtime dashboard. Such dashboards may include information for performance tests during execution (e.g., with an "execution" status), where tests may be grouped by components, scenarios, or both. Such dashboards may include links to the corresponding results dashboards. The control dashboard, runtime dashboard, or integrated control-and-runtime dashboard may support the troubleshooting mode and may provide simplified data access and visualization with key data in a single screen view.

Figure 3:
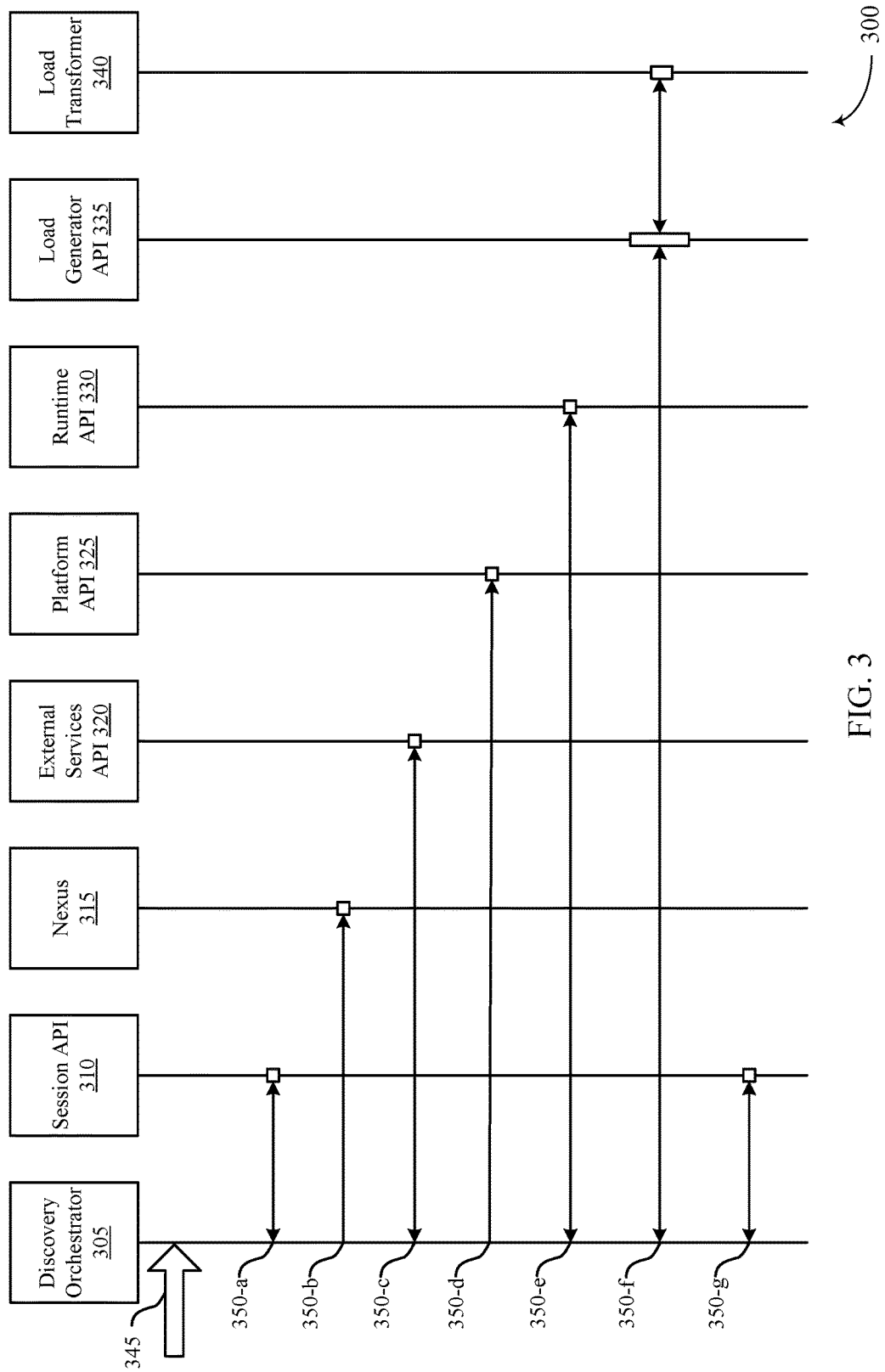
FIG. 3 illustrates an example of a system architecture that supports orchestration for automated performance testing in accordance with aspects of the present disclosure.

FIG. 3 illustrates an example of a system architecture 300 that supports orchestration for automated performance testing in accordance with aspects of the present disclosure. The system architecture 300 may include a discovery orchestrator 305, a session API 310, a nexus 315, an external services API 320, a platform API 325, a runtime API 330, a load generator API 335, and a load transformer 340, which may be examples or components of one or more APIs, servers, and/or cloud platforms as described with reference to FIGS.

1 and 2. For example, the discovery orchestrator 305 may be an example or component of a data center 120, a cloud platform 115, or an orchestration server 205. The session API 310, the nexus 315, the external services API 320, the platform API 320, the runtime API 330, the load generator API 335, the load transformer 340, or any combination thereof may be examples or components of a data center 120, a cloud platform 115, a test environment 230, or an artifact 235. In some cases, the system architecture 300 may include additional or alternative components to those illustrated in FIG. 3.

The discovery orchestrator 305 may represent aspects of an application server, communication server, data processing server, database server, cloud-based server, server cluster, virtual machine, container, or some similar data processing device or system. The discovery orchestrator 305 may communicate with other devices such as a number of servers or APIs (e.g., the session API 310, the nexus 315, the external services API 320, the platform API 325, the runtime API 330, the load generator API 335, the load transformer 340, etc.), and the discovery orchestrator 305 may orchestrate information between such components in order to support running a performance test 345. For example, the discovery orchestrator 305 may receive, from one or more user devices or other systems, a performance test 345 and may execute the performance test 345 (e.g., based on an execution command, trigger, or schedule).

In some cases, the performance test 345 may be associated with a file that indicates a configuration corresponding to the performance test. The file may include a runtime environment, a number of policies, a target, a platform, a number of test parameters, or any combination thereof. An example file is included below.

```
@RunWith(Ambar.class)
public class DiscoveryTestCase {
    public static final int NK50 = 50000;
    @Standalone(testing = "4.2.2")
    private Runtime runtime;
    @TestTarget
    @Policy(artifactID = "rate-limiting")
    protected PolicySupplier policy;
    @Platform
    protected ApiManager apiManager;
    @Performance
    private Discovery discovery;
    @Before
    public void setup( ) {
        apiManager.apply(policy, a100KDistributed( ));
    }
    @Test
    public void performanceWhenQuotaIsExhausted( ) {
        discovery
            .run(( ) -> runtime.api( ).request( ))
            .during(N50K)
            .withThreads(100)
            .go( );
    }
    private Map<String, Object> a100KDistributed( ) {
        return new RateLimitConfigBuilder( )
            .withTier(new SingleTier(N50K, 6666666666L))
            .clusterizable(true)
            .exposeHeaders(true)
            .build( );
    }
}
```

Such a file may act as a unified language for performance testing, and may provide abstractions above the underlying performance components. For example, the file may not specify particular servers to spin up or indicate how to run particular tests; instead, these details may be handled by the underlying, automated performance testing system.

The discovery orchestrator 305 may set up an environment and session for running one or more performance tests 345 indicated by the file. In some cases, an application developer may create such a file for performance testing of the developer's application (e.g., based on classes, methods, policies, runtimes, environments, or some combination thereof defined by a performance team). For example, similar to defining a functional test for the application, the developer may define a performance test using a few lines of code (e.g., rather than relying on the performance team to define the performance test). This code may be built on top of a well-established set of APIs (e.g., defined by the performance team). The performance team may further provide a stable infrastructure for running performance tests 345 and create, update, and/or maintain dashboards, logs, or other systems for the software developers to access and interpret performance data. In turn, the development team may define the tests to be run (e.g., using the underlying performance framework and tools) as part of a software development cycle (e.g., similar to functional testing). In this way, the development team may iteratively test and update production code to improve performance, including, in some examples, creating and configuring new tests throughout the process.

In some examples, the code file for performance testing may specify a set of test parameters. For example, the code file may indicate that the performance test uses a backend that responds in a specific way, uses a load client that hits the application in a specific way, deploys the application in a particular configuration, or some combination thereof. To orchestrate between components (e.g., the backend, a database, one or more machines running the application, etc.), the code file may indicate expected responses for different paths. For example, the code file may indicate a specific HTTP request with a specific payload for a particular path, as well as an expected response to the HTTP request (e.g., such as a 200 response). As spinning up the machines and synchronizing the components takes a non-trivial amount of time at execution, the framework may use the code file to automate this process (e.g., at the discovery orchestrator 305).

Such a framework may support integrating accurate, frequent performance testing into the software development process using performance infrastructure and metrics. Performance resources may be utilized to build new data visualizations and support infrastructure scaling, rather than to configure single-use—or otherwise specialized—environments for testing performance for specific applications. The framework may support any application developers interested in performance testing. For example, a Rest API may support applying the performance infrastructure to any data or software pipeline.

The system architecture 300 provides an example performance testing procedure utilizing an example set of APIs. The example performance testing procedure may test the performance of an API gateway service, including a software application (e.g., an HTTP gateway application). In some cases, the performance testing procedure may further include a set of test parameters, such as one or more dynamically added policies, a request (e.g., a GET or POST request), user credentials supporting connection to a runtime manager, an indication of an HTTP backend (e.g., a backend server or system), a success criterion (e.g., an expected output of the test, such as a specific HTTP code or a specific throughput), or some combination of these. However, it is to be understood that other testing procedures and APIs may be supported by the system and processes described herein. Each API may connect to an actual platform (e.g., external to the discovery orchestrator 305) or may use a local mock implementation.

At 350-a, the discovery orchestrator 305 may transmit a new session request to the session API 310. In some cases, the request may be associated with a team, a product, a sub-product, or a test, and the session API 310 may create a session based on the request. Creating the session may involve creating a unique session token for the session. The session API 310 may transmit a session token (e.g., a JavaScript object notation (JSON) web token (JWT)) to the discovery orchestrator 305 in response to the new session request. In some cases, the session API 310 may spin up a number of servers and/or services (e.g., artifacts) based on the request, and the session API 310 may transmit the session token based on the servers and/or services. In some cases, the session API 310 may enforce artifact dependencies and return the session token in accordance with the dependencies. In some additional or alternative cases, the session API may store information associated with the state of the system architecture 300, and the information may be associated with the session token. In some examples, the system architecture 300 may execute a single performance test per session. In some other examples, the system architecture 300 may execute multiple performance tests (e.g., for a same user, for a same software application, in a same test environment, etc.) in a session. An execution engine (e.g., at the discovery orchestrator 305 or another component) may, in some cases, determine how and/or where to deploy the runtime for the session. Additionally or alternatively, the execution engine may dynamically modify where the runtime is deployed (e.g., to test different scenarios, improve performance, etc.). For example, at runtime, the execution engine may read a configuration (e.g., based on a set of test parameters) and determine what to load. This determination may be based on underlying systems (e.g., available, spun up servers, available ports, etc.).

At 350-b, the discovery orchestrator 305 may deploy an application and/or a number of artifacts to the nexus 315. In some cases, the nexus 315 may be an example or component of a data store or data processing system. The deployment may be based on the execution engine as described herein.

At 350-c, the discovery orchestrator 305 may request a server instance (e.g., an Eclipse Vert.x instance or some other system for building reactive applications) for the session from the external services API 320. The request for a server instance may include the session token, and in some cases, the session API 310 may coordinate the activation (e.g., spin up) of the server. In some cases, the activation may include spinning up a physical server or creating a virtual space or system (e.g., on a Java Virtual Machine (JVM)) for executing at least a portion of a performance test. The external services API 320 may activate a server instance for the discovery orchestrator 305. For example, the external services API 320 may transmit an indication of the server configuration, a deployment host associated with the server instance, a port associated with the server instance (e.g., supporting communication with the server instance), or a combination thereof to the discovery orchestrator 305. Such server configurations may support multiple requests to multiple endpoints (e.g., ports), where each endpoint manages a part of the orchestrated system. The discovery orchestrator 305 may use the session API 305 to communicate between the different APIs and support communication between the different systems, components, and/or endpoints. This may allow the discovery orchestrator 305 to prepare each component of the performance test to run prior to triggering the execution of the performance test. For example, the discovery orchestrator 305 may spin up an HTTP server, a database, a proxy server, or some combination of these or other machines or systems, and the discovery orchestrator 305 may orchestrate information across these machines or systems (e.g., across different components or test artifacts). For example, the orchestration may involve linking the machines or systems or otherwise providing information used to communicate between the machines or systems (e.g., active ports, APIs, etc.). Using such machines or systems may provide information about memory usage and processing resources in actual test environments.

At 350-d, the discovery orchestrator 305 may transmit a request to the platform API 325, where the request may indicate one or more policies and/or contracts. The platform API 325 may apply the policies to the test environment and/or enforce the contracts during the execution of the performance test.

At 350-e, the discovery orchestrator 305 may transmit the application and a set of parameters to the runtime API 330. In some cases, the runtime API 330 may be configured in accordance with the set of parameters received from the performance test 345. In some additional or alternative cases, a software patch may be sent to the runtime API 330. For example, an application version may be running on the platform API 330 that does not contain the software patch, or the discovery orchestrator 305 may transmit an application version to the runtime API 330 that does not contain the software patch, and the discovery orchestrator 305 may transmit the patch to the runtime API 330. The runtime API 330 may transmit a runtime host (e.g., the internet protocol (IP) address of the host) and a port number of the host to the discovery orchestrator 305 for performing runtime operations for the session.

At 350-f, the discovery orchestrator 305 may send load testing information to the load generator API 335. In some cases, the load testing information may be associated with the session, and in some additional or alternative cases, the discovery orchestrator 305 may transmit the session token to the load generator API 335. The load generator API 335 may communicate with the load transformer 340. For example, the load generator API 335 may transmit an indication of a load (e.g., a request load) to the load transformer 340, and the load transformer 340 may configure a load client (e.g., JMeter or some other load client) based on the indication of the load (e.g., as indicated in a .json file, as indicated in a .yaml file, etc.). The load transformer 340 may transmit a configuration file associated with the load client to the load generator API 335, and the load generator API 335 may transmit the configuration file to the discovery orchestrator 305.

At 350-g, the discovery orchestrator 305 may run the session. For example, the discovery orchestrator 305 may transmit a request to the session API 310, and the session API 310 may run the session using the orchestrated components. For example, the discovery orchestrator 305 may provide server configurations, deployment hosts, ports, runtime hosts, runtime ports, load testing configurations (e.g., details of the load testing type), or any combination thereof for the session API 310 to run the performance test for the session. Running the session may involve performing a number of isolated executions across different components (e.g., isolated at different physical machines, such as worker servers, virtual environments, or some combination thereof). In some examples, the session API 310 may transmit a uniform resource locator (URL) to the discovery orchestrator 305 in response. The URL may be associated with the performance test results. In some cases, the performance test results may be accessible from the URL. The performance test results may be associated with a performance test status, a performance test time, or a number of performance test metrics. For example, the performance test results may indicate resource usage information (e.g., central processing unit (CPU) resources), latency information (e.g., how long different portions of the application take to run in a given environment), or some combination thereof.

In some cases, performance test results may be validated based on one or more validation suites. For example, a subset of available tests may be executed for analysis and documentation to ensure validity of the performance metrics. Additionally or alternatively, the system may support an alert system that generates periodic reports (e.g., daily reports, weekly reports, etc.) and pushes notifications to users if the system identified a performance issue (e.g., a bottleneck, an issue associated with a particular test environment, etc.).

The system may support robust documentation for performance testing. For example, the system may provide a static or custom list of tuning options for performance testing. These tuning options may correspond to different components and/or APIs. A user may modify the tuning options to update performance results (e.g., in real-time or pseudo real-time). For example, the tuning options may include Java tuning options, such as an application version, garbage collection (GC) settings, or memory settings.

The system may publish a public facing report, an internal facing report, or both for performance tracking. A public facing report may include, for example, each version (e.g., each minor version or each major version) of a runtime and the results for key scenarios under different deployment options for the runtime. These results may be compared to previous versions, may include recommendations for how to use and/or improve the software application, or some combination thereof. An internal facing report may include, for example, each patch version of the runtime and the corresponding results. Additionally or alternatively, the system may support a performance library for users (e.g., users with the requisite credentials for accessing the library or particular information in the library). The performance library may include scenarios data, benchmarks, official documentation, and the like. In some cases, portions of this data may be viewed based on a user's authorization level. In some examples, the information stored in the performance library may be generated and published through a workflow for verification by one or more users. If verified, the information—or a portion of the information—may be published for access by external teams or users.

Other performance testing use cases may include—but are not limited to—testing for HTTP proxies, message services, batch processes, or any other supported applications. For example, an HTTP proxy performance test may include similar test parameters as an API gateway test (e.g., other than the policies). A message service (e.g., Java message service (JMS) or another message service) performance test may involve preconditions. For example, the set of test parameters may include a specific script to preload a queue with multiple messages (e.g., millions of messages) to test the performance of the message service. The set of test parameters for a message service may include a source queue identifier and a target queue identifier. Additionally or alternatively, the backend for the message service may be a messaging server (e.g., ActiveMQ or another messaging server), while the expected output may be an empty queue for a listener component or a bridge component or may be a number of messages in the target queue. A batch process performance test may include, in the set of test parameters, a catalog of files to process. The expected output for such a batch process may be a file produced by the batch application using the catalog of files, while the backend may support loading data into a database according to the batch application. In some examples, performance testing for a batch process may not use a load client, such as JMeter. Other performance testing use cases may involve clustering, handling multiple different types of requests with a distribution function, or any other software application reliant on a particular performance quality attribute.

Figure 4:
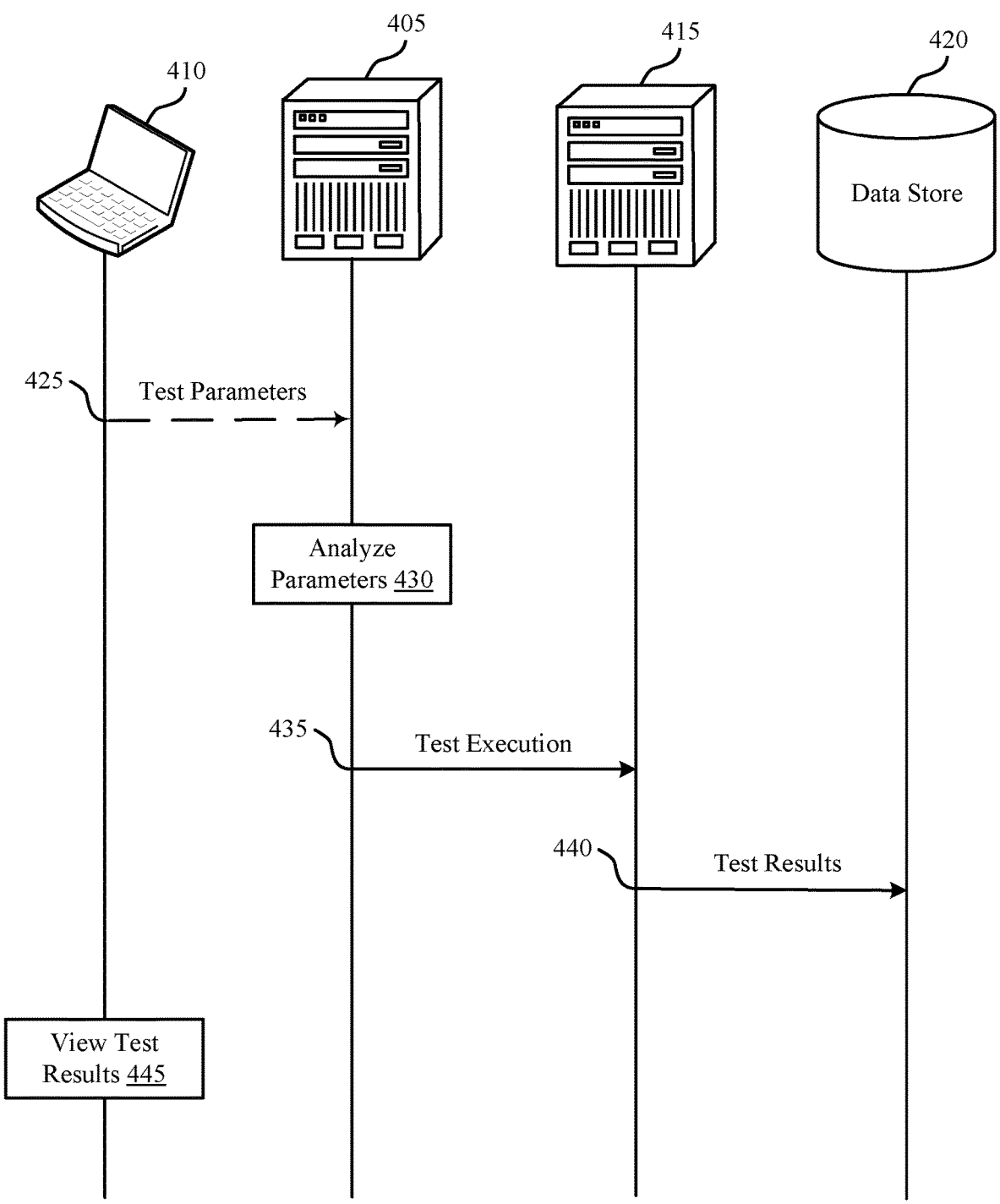
FIGS. 4 and 5 illustrate examples of process flows that support orchestration for automated performance testing in accordance with aspects of the present disclosure.

FIG. 4 illustrates an example of a process flow 400 that supports orchestration for automated performance testing in accordance with aspects of the present disclosure. The process flow 400 includes an orchestration server 405, a user device 410, a performance platform 415, and a data store 420. The orchestration server 405, the performance platform 415, and the data store 420 may be examples or components of one or more servers and/or cloud platforms as described with reference to FIGS. 1 through 3. For example, the orchestration server 405, the performance platform 415, or the data store 420 may be examples or components of a data center 120, a cloud platform 115, an orchestration server 205, or an orchestration server 305. The user device 410 may be an example or component of a cloud client 105, a contact 110, or a user device 210.

At 425, the orchestration server 405 may receive a set of test parameters associated with a performance test for a software application. In some cases, the set of test parameters may include a number of threads, a runtime version, an application configuration (e.g., policies, batch files, etc.), information to identify the application, the product associated with the application, a user sending the test parameters, the user device 410, success criteria, a label associated with a dashboard, or any combination thereof.

At 430, the orchestration server 405 may analyze the set of test parameters to determine a number of artifacts that may be used in a test environment. In some cases, the orchestration server 405 may determine whether the software application is present in a data store associated with performance tests. If the software application is not present in the data store associated with performance tests, the orchestration server 405 may retrieve the software application from a code repository and deploy the software application to the data store associated with performance tests. In some cases, the orchestration server 405 may determine, in real-time or pseudo real-time, a dashboard view and a dashboard URL. The orchestration server 405 may transmit the dashboard URL to the user device 410. In some cases, the orchestration server 405 may determine whether to execute the performance test, and in some cases, the orchestration server 405 may determine whether to execute the performance test based on the time a last performance test was executed, a time delta associated with the last execution of the performance test, a number of queued performance tests, the types of queued performance tests, or some combination thereof.

At 435, the orchestration server 405 may launch the performance test. In some examples, the orchestration server 405 may start a job (e.g., a continuous integration job, a job associated with an automation server, etc.) to launch the performance test. The performance platform 415 may execute the performance test, and the performance platform 415 may receive or collect results associated with the performance test.

At 440, the performance platform 415 may store the results in the data store 420. In some cases, the orchestration server 405 or the performance platform 415 may calculate and/or store performance metrics associated with the performance test in the data store 420. For example, a performance metric may track performance improvement or degradation between different versions of a software application, or between different testing environments for a software application.

At 445, a user associated with a user device 410 may view the performance test results and/or the performance metrics. For example, the user may view the results by accessing the dashboard URL. In some other cases, the performance platform 415 may surface the results to the user device 410 for display in a user interface. In some cases, a performance bottleneck may be indicated via a visual representation or a number of performance metrics.

In some examples, the user may perform further performance testing in a local environment (e.g., at the user device 410 or local to a backend server) based on the performance test results. For example, the performance test results may be based on running the performance test across a number of different systems and/or devices to determine accurate performance metrics. However, while updating the software application, the user may perform one or more local, mocked performance tests to estimate relative performance gains or losses based on changes to the code. The local testing environment may be consistent with the performance testing environment (e.g., supporting all of the same tests and functions, without the same accuracy based on using actual testing environments, machines, etc.).

Figure 5:
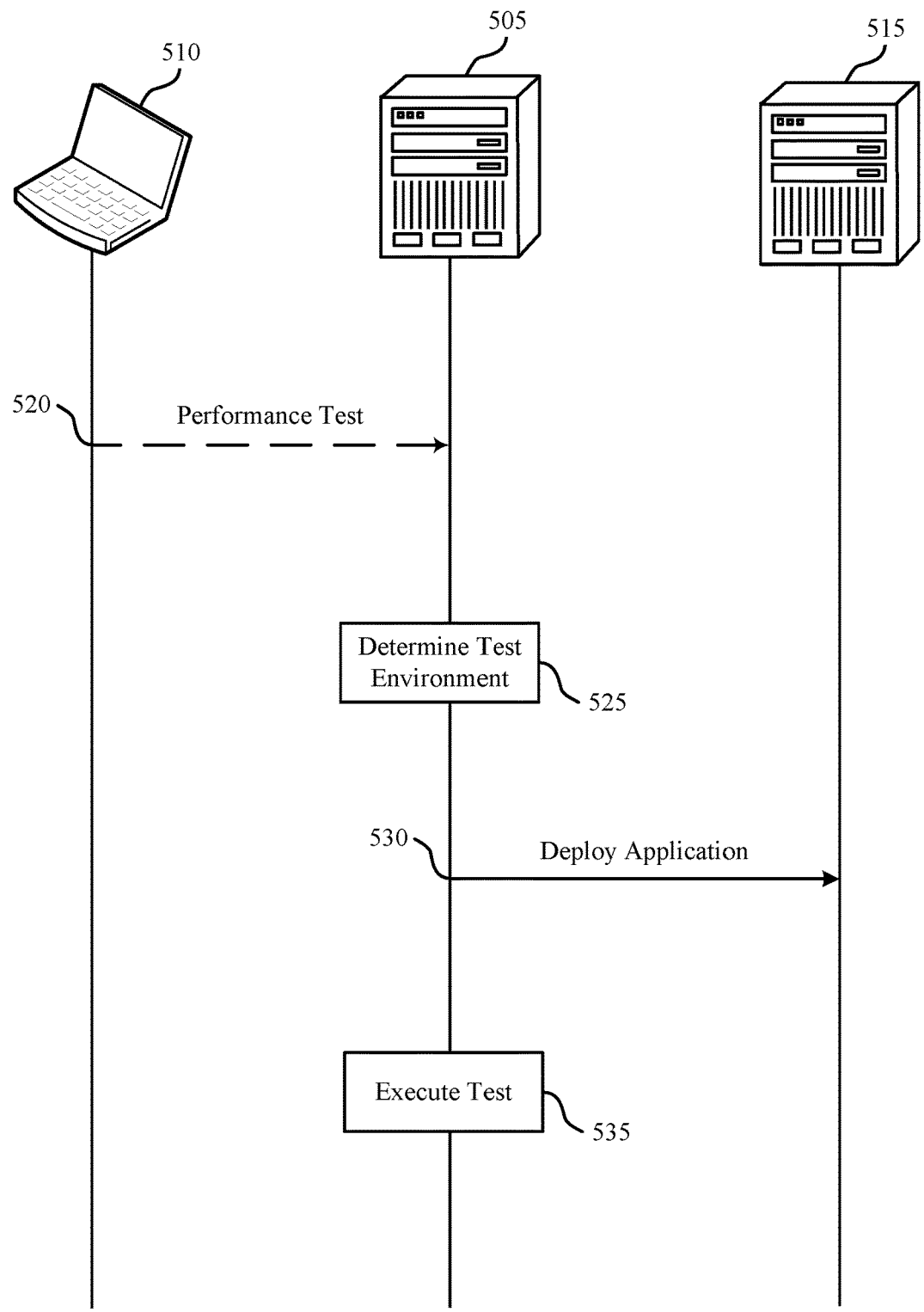

FIG. 5 illustrates an example of a process flow 500 that supports orchestration for automated performance testing in accordance with aspects of the present disclosure. The process flow 500 may include an orchestration server 505, a user device 510, and a test environment 515. These may be examples of the corresponding devices described with reference to FIGS. 1 through 4. The orchestration server 505 may implement orchestration for performance testing to automatically test the performance of a software application. Automatic performance testing may reduce testing time, identify performance bottlenecks, and improve system performance. Alternative examples of the following may be implemented, where some steps are performed in a different order than described or are not performed at all. In some cases, steps may include additional features not mentioned below, or further steps may be added.

At 520, the orchestration server 505 may receive a performance test from the user device 510. The performance test may indicate an application to test and a set of test parameters. In some cases, the test parameters may be associated with a test environment configuration.

At 525, the orchestration server 505 may determine a test environment for running the performance test. In some cases, the test environment may be based on the set of test parameters. In some additional or alternative cases, the orchestration server 505 may retrieve the application and/or a number of test artifacts from a data store.

At 530, the orchestration server 505 may deploy the application to the test environment 515. In some cases, deploying the application may involve deploying a first component of the performance test to a first test artifact in the test environment 515 and deploying a second component of the performance test different from the first component to a second test artifact in the test environment 515.

At 535, the orchestration server 505 may execute or trigger the execution of the performance test to obtain a result set. In some cases, executing the performance test may include performing a first isolated execution of the first component using the first test artifact and a second isolated execution of the second component using the second test artifact based on the set of test parameters. Executing the performance test may further include orchestrating results across the first test artifact and the second test artifact to obtain the result set. In some examples, the orchestration server 505 or a component of the test environment 515 may additionally generate performance metrics associated with the performance test. The user device 510 may, in some cases, display information related to the result set (e.g., for a user to view and analyze).

Figure 6:
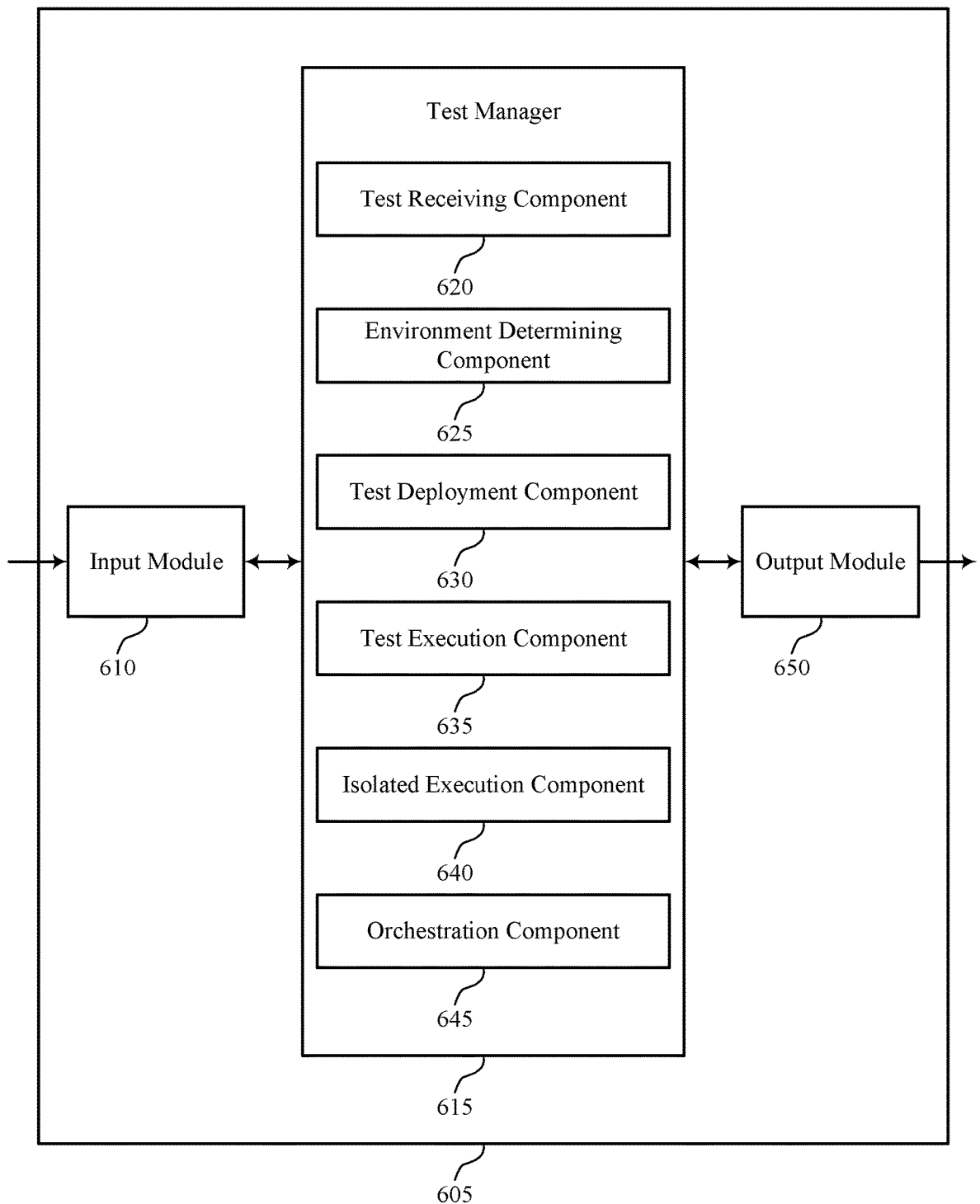
FIG. 6 shows a block diagram of an apparatus that supports orchestration for automated performance testing in accordance with aspects of the present disclosure.

FIG. 6 shows a block diagram 600 of an apparatus 605 that supports orchestration for automated performance testing in accordance with aspects of the present disclosure. The apparatus 605 may include an input module 610, a test manager 615, and an output module 650. The apparatus 605 may also include a processor. Each of these components may be in communication with one another (e.g., via one or more buses). In some cases, the apparatus 605 may be an example of a user terminal, a server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the test manager 615 to support orchestration for automated performance testing. In some cases, the input module 610 may be a component of an input/output (I/O) controller 815 as described with reference to FIG. 8.

The test manager 615 may include a test receiving component 620, an environment determining component 625, a test deployment component 630, a test execution component 635, an isolated execution component 640, and an orchestration component 645. The test manager 615 may be an example of aspects of the test manager 705 or 810 described with reference to FIGS. 7 and 8.

The test manager 615 and/or at least some of its various sub-components may be implemented in hardware, software executed by a processor, firmware, or any combination thereof. If implemented in software executed by a processor, the functions of the test manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The test manager 615 and/or at least some of its various sub-components may be physically located at various positions, including being distributed such that portions of functions are implemented at different physical locations by one or more physical devices. In some examples, the test manager 615 and/or at least some of its various sub-components may be a separate and distinct component in accordance with various aspects of the present disclosure. In other examples, the test manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The test receiving component 620 may receive, from a user device, a performance test indicating an application to test and a set of test parameters. The environment determining component 625 may determine, by an execution engine, a test environment for running the performance test. The test deployment component 630 may deploy the application to the test environment, where the deploying includes deploying a first component of the performance test to a first test artifact in the test environment and deploying a second component of the performance test different from the first component to a second test artifact in the test environment.

The test execution component 635 may execute the performance test to obtain a result set. For example, the executing may involve the isolated execution component 640 performing a first isolated execution of the first component using the first test artifact and a second isolated execution of the second component using the second test artifact based on the set of test parameters. Furthermore, the executing may involve the orchestration component 645 orchestrating results across the first test artifact and the second test artifact to obtain the result set.

The output module 650 may manage output signals for the apparatus 605. For example, the output module 650 may receive signals from other components of the apparatus 605, such as the test manager 615, and may transmit these signals to other components or devices. In some specific examples, the output module 650 may transmit output signals for display in a user interface, for storage in a database or data store, for further processing at a server or server cluster, or for any other processes at any number of devices or systems. In some cases, the output module 650 may be a component of an I/O controller 815 as described with reference to FIG. 8.

Figure 7:
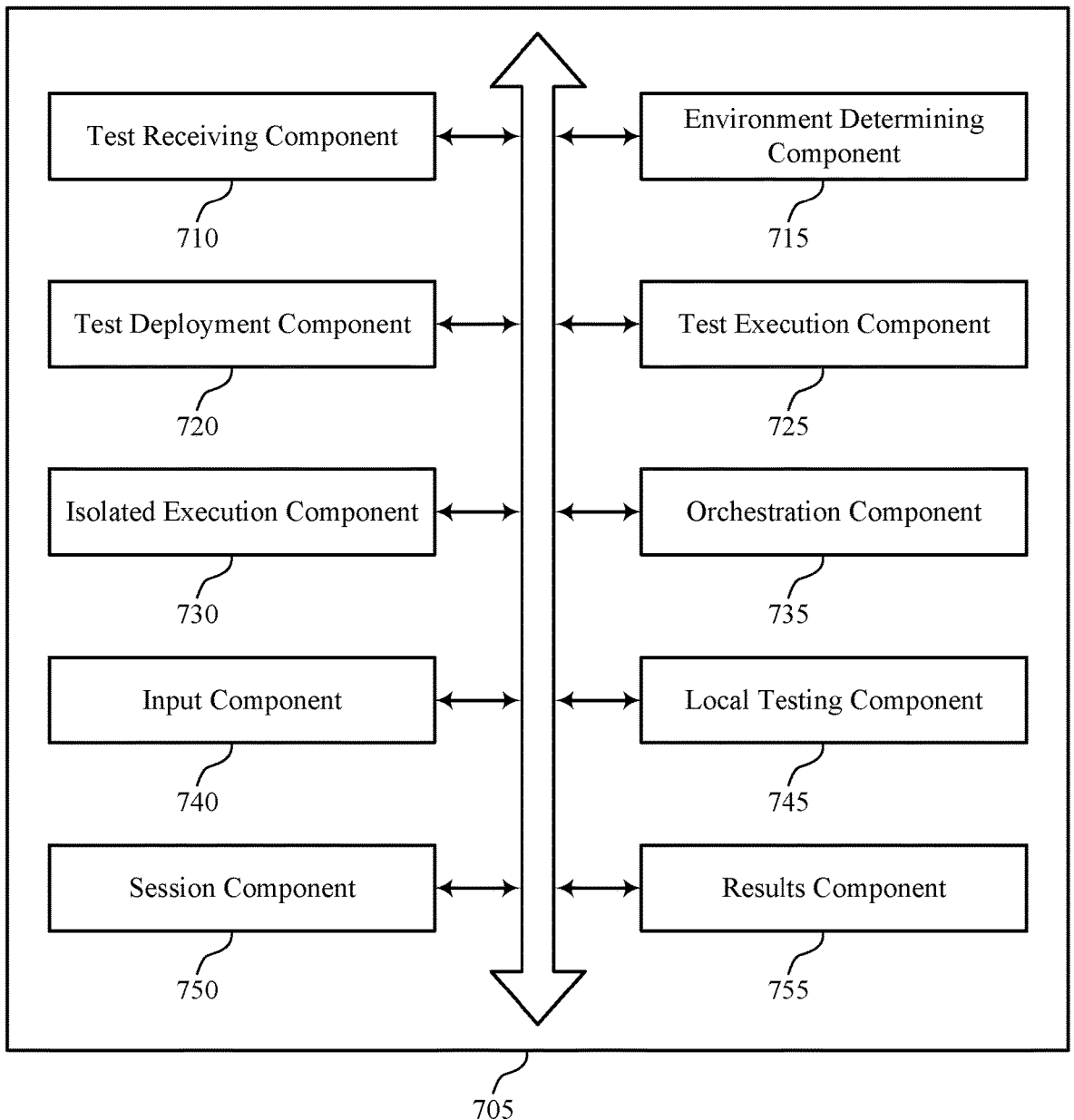
FIG. 7 shows a block diagram of a test manager that supports orchestration for automated performance testing in accordance with aspects of the present disclosure.

FIG. 7 shows a block diagram 700 of a test manager 705 that supports orchestration for automated performance testing in accordance with aspects of the present disclosure. The test manager 705 may be an example of aspects of a test manager 615 or a test manager 810 described herein. The test manager 705 may include a test receiving component 710, an environment determining component 715, a test deployment component 720, a test execution component 725, an isolated execution component 730, an orchestration component 735, an input component 740, a local testing component 745, a session component 750, a results component 755, or any combination of these or other components. Each of these modules may communicate, directly or indirectly, with one another (e.g., via one or more buses).

The test receiving component 710 may receive, from a user device, a performance test indicating an application to test and a set of test parameters. In some cases, the set of test parameters includes one or more threads, a runtime version, one or more policies, one or more batch files, identification information, a success criterion, one or more labels, or a combination thereof.

The environment determining component 715 may determine, by an execution engine, a test environment for running the performance test. The test deployment component 720 may deploy the application to the test environment, where the deploying may involve deploying a first component of the performance test to a first test artifact in the test environment and deploying a second component of the performance test different from the first component to a second test artifact in the test environment. In some examples, the test deployment component 720 may send the first component to the first test artifact via a first API and may send the second component to the second test artifact via a second API. In some examples, the test deployment component 720 may deploy, in a first deployment step, the first component of the performance test to the first test artifact. In some such examples, the test deployment component 720 may orchestrate information sharing from the deployed first component to a second deployment step, where the second component of the performance test, the second test artifact, or both depend on at least a portion of the information, and may deploy, in the second deployment step, the second component of the performance test to the second test artifact based on the portion of the information.

The test execution component 725 may execute the performance test to obtain a result set. The isolated execution component 730 may perform a first isolated execution of the first component using the first test artifact and a second isolated execution of the second component using the second test artifact based on the set of test parameters. The orchestration component 735 may orchestrate results across the first test artifact and the second test artifact to obtain the result set.

In some examples, the environment determining component 715 may determine, by the execution engine, a second test environment for running the performance test different from the test environment. In some such examples, the test deployment component 720 may deploy the application to the second test environment, and the test execution component 725 may execute the performance test for the application at the second test environment based on the set of test parameters to obtain a second result set.

The input component 740 may receive a user input indicating a first test environment for running the performance test, where the test environment includes either the first test environment or a mock implementation of the first test environment, and the determining may further include the input component 740 determining, by the execution engine, whether to run the performance test at the first test environment or the mock implementation of the first test environment based on a set of available APIs, a user authorization, a processing overhead threshold, the set of test parameters, or a combination thereof.

In some cases, the test environment may be an example of a mock test environment running locally at an application server, and the performance test may be executed locally at the application server. In some cases, the result set indicates comparative performance metrics for the first isolated execution and the second isolated execution.

The session component 750 may create a session for running the performance test and may spin up a set of machines for the session, where the set of machines includes at least the first test artifact and the second test artifact. In some examples, the session component 750 may activate a session API based on creating the session, where the results are orchestrated across the first test artifact and the second test artifact using the session API. In some examples, the session component 750 may create a session token based on creating the session, where the performance test is executed based on the session token. In some examples, the session component 750 may delete the session token based on obtaining the result set.

In some examples, executing the performance test may involve a first execution of the performance test. In some such examples, the test execution component 725 may execute the performance test for a second execution of the performance test and may track a performance regression metric, a performance improvement metric, or both based on the first execution of the performance test and the second execution of the performance test. In some cases, the performance test is executed based on a schedule, a testing periodicity, a testing queue, or a combination thereof.

In some examples, the input component 740 may receive a user input defining the first test artifact. In some examples, the input component 740 may publish the first test artifact based on the user input, where deploying the first component of the performance test to the first test artifact is based on publishing the first test artifact. In some examples, the input component 740 may identify a configuration file, where the test environment is determined for running the performance test at execution time based on the configuration file.

The local testing component 745 may support the local testing of the software application. In some cases, the local testing component 745 may support the testing of the software application at a user device to identify performance bottlenecks and/or software bugs. For example, the local testing component 745 may be used to debug the software application.

The results component 755 may store, at a database, the result set. In some examples, the results component 755 may send, for display in a user interface of a user device, at least a portion of the result set.

Figure 8:
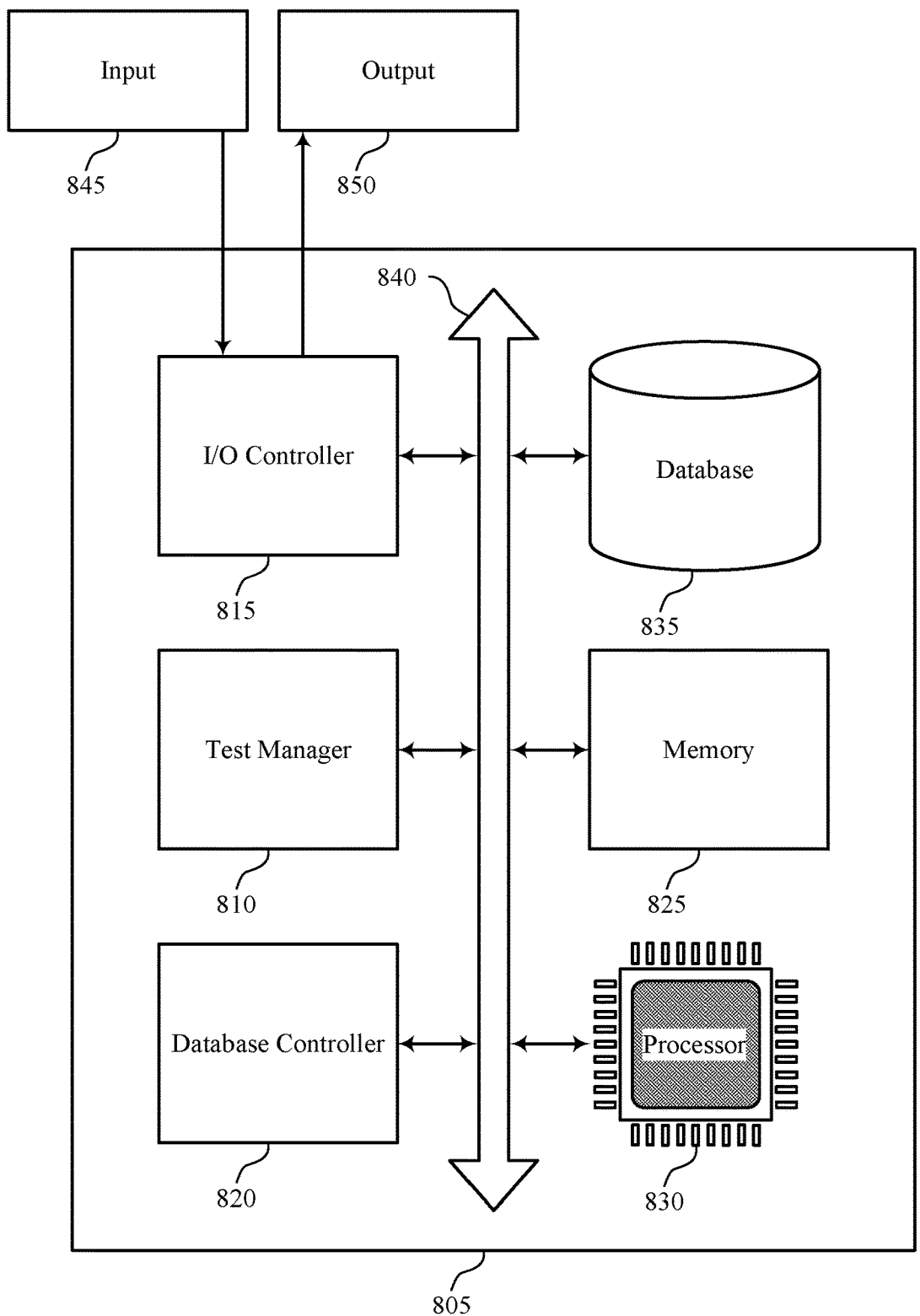
FIG. 8 shows a diagram of a system including a device that supports orchestration for automated performance testing in accordance with aspects of the present disclosure.

FIG. 8 shows a diagram of a system 800 including a device 805 that supports orchestration for automated performance testing in accordance with aspects of the present disclosure. The device 805 may be an example of or include the components of an application server or an apparatus 605 as described herein. The device 805 may include components for bi-directional data communications including components for transmitting and receiving communications, including a test manager 810, an I/O controller 815, a database controller 820, memory 825, a processor 830, and a database 835. These components may be in electronic communication via one or more buses (e.g., bus 840).

The test manager 810 may be an example of a test manager 615 or 705 as described herein. For example, the test manager 810 may perform any of the methods or processes described above with reference to FIGS. 6 and 7. In some cases, the test manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic I/O system (BIOS) which may control basic hardware or software operation such as the interaction with peripheral components or devices.

The processor 830 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting orchestration for automated performance testing).

Figure 9:
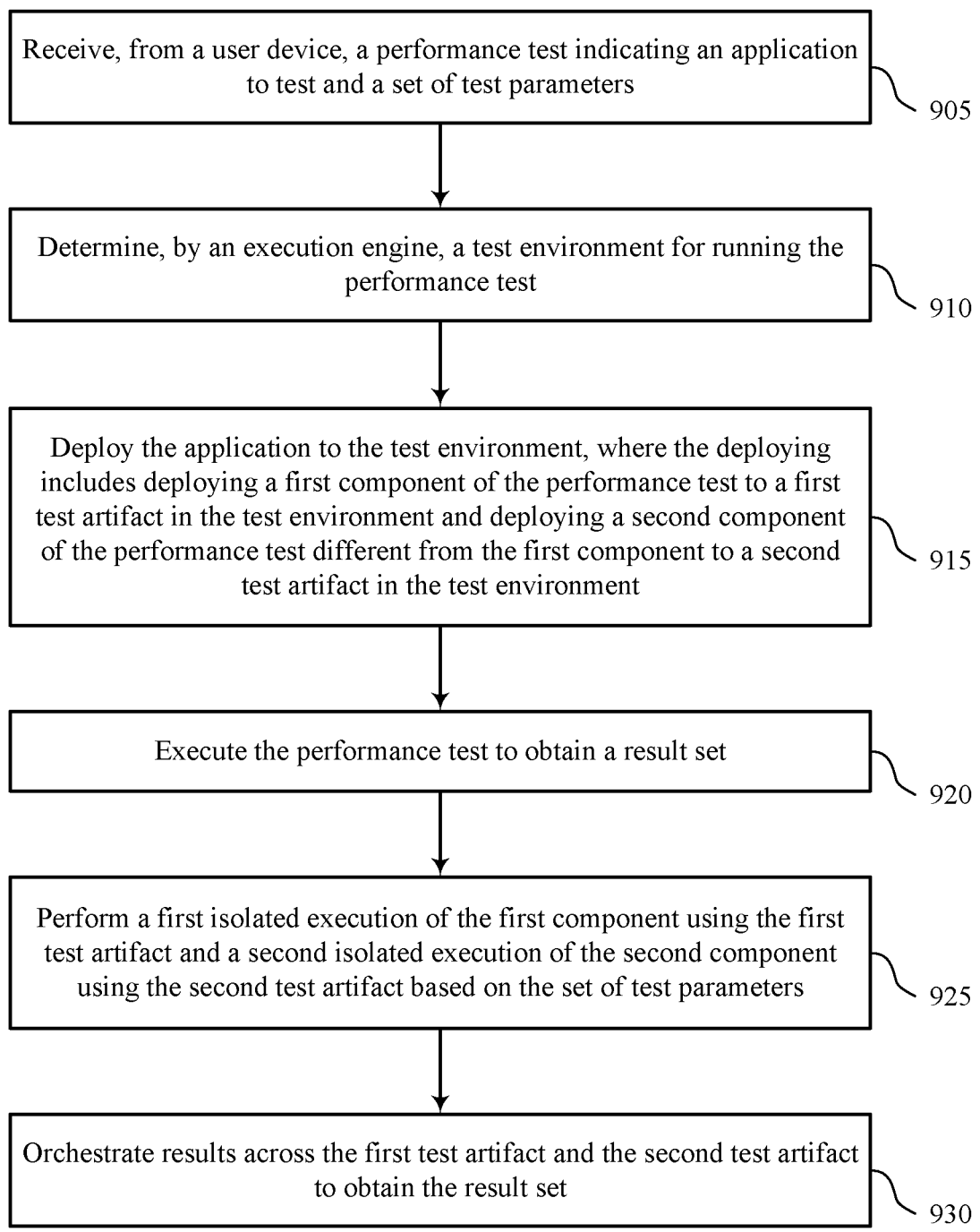
FIGS. 9 through 11 show flowcharts illustrating methods that support orchestration for automated performance testing in accordance with aspects of the present disclosure.

FIG. 9 shows a flowchart illustrating a method 900 that supports orchestration for automated performance testing in accordance with aspects of the present disclosure. The operations of method 900 may be implemented by a server (e.g., a single server, a server cluster, an application server, a database server, a cloud-based server, a virtual machine, a container, or any other system or device supporting data processing) or its components as described herein. For example, the operations of method 900 may be performed by a test manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 905, the application server may receive, from a user device, a performance test indicating an application to test and a set of test parameters. The operations of 905 may be performed according to the methods described herein. In some examples, aspects of the operations of 905 may be performed by a test receiving component as described with reference to FIGS. 6 through 8.

At 910, the application server may determine, by an execution engine, a test environment for running the performance test. The operations of 910 may be performed according to the methods described herein. In some examples, aspects of the operations of 910 may be performed by an environment determining component as described with reference to FIGS. 6 through 8.

At 915, the application server may deploy the application to the test environment. In some cases, the deploying may involve deploying a first component of the performance test to a first test artifact in the test environment and deploying a second component of the performance test different from the first component to a second test artifact in the test environment. The operations of 915 may be performed according to the methods described herein. In some examples, aspects of the operations of 915 may be performed by a test deployment component as described with reference to FIGS. 6 through 8.

At 920, the application server may execute the performance test to obtain a result set. In some cases, executing the performance test may involve the processes described with reference to 925 and 930. The operations of 920 may be performed according to the methods described herein. In some examples, aspects of the operations of 920 may be performed by a test execution component as described with reference to FIGS. 6 through 8.

At 925, the application server may perform a first isolated execution of the first component using the first test artifact and a second isolated execution of the second component using the second test artifact based on the set of test parameters. The operations of 925 may be performed according to the methods described herein. In some examples, aspects of the operations of 925 may be performed by an isolated execution component as described with reference to FIGS. 6 through 8.

At 930, the application server may orchestrate results across the first test artifact and the second test artifact to obtain the result set. The operations of 930 may be performed according to the methods described herein. In some examples, aspects of the operations of 930 may be performed by an orchestration component as described with reference to FIGS. 6 through 8.

Figure 10:
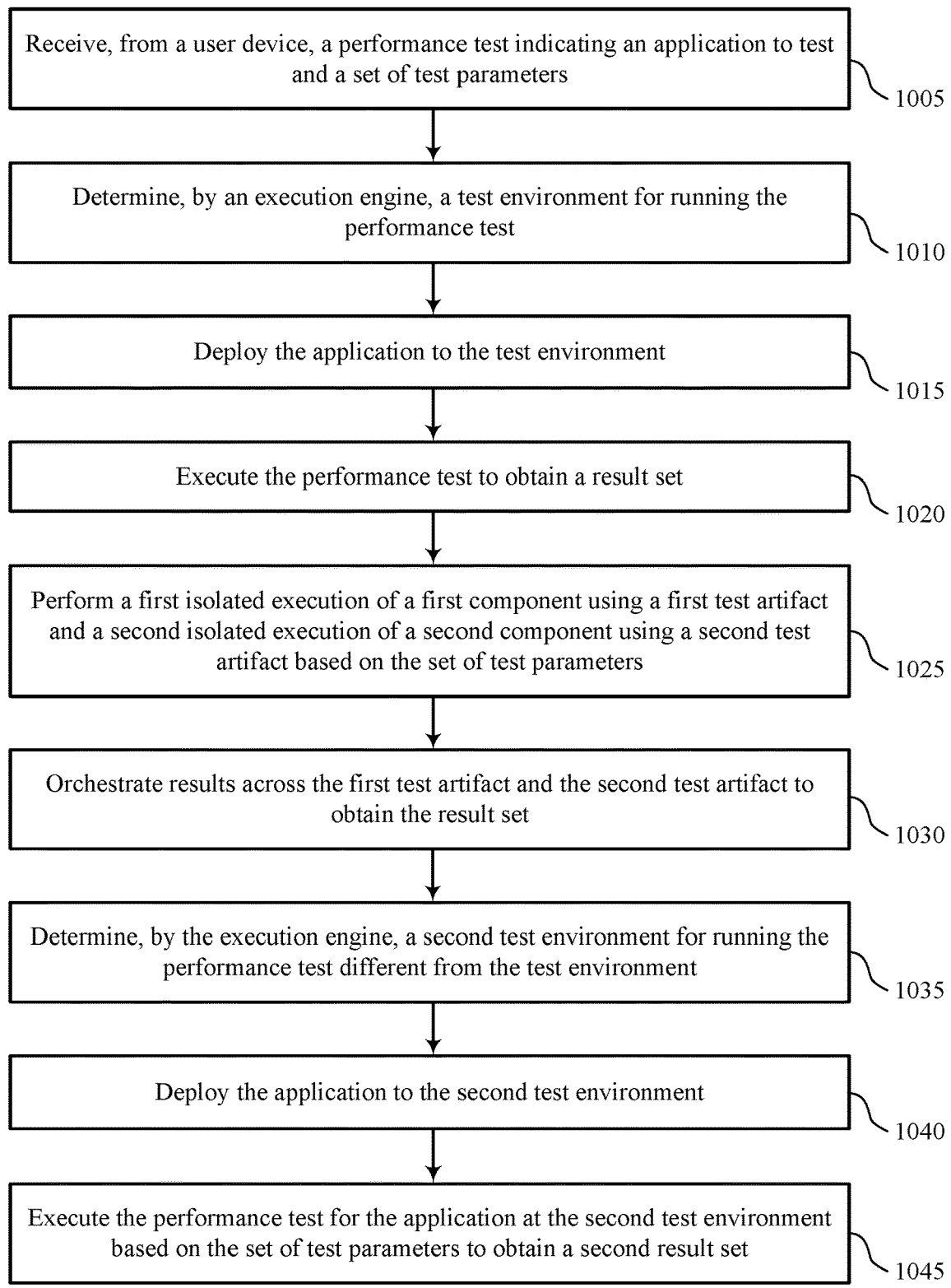

FIG. 10 shows a flowchart illustrating a method 1000 that supports orchestration for automated performance testing in accordance with aspects of the present disclosure. The operations of method 1000 may be implemented by an application server or its components as described herein. For example, the operations of method 1000 may be performed by a test manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1005, the application server may receive, from a user device, a performance test indicating an application to test and a set of test parameters. The operations of 1005 may be performed according to the methods described herein. In some examples, aspects of the operations of 1005 may be performed by a test receiving component as described with reference to FIGS. 6 through 8.

At 1010, the application server may determine, by an execution engine, a test environment for running the performance test. The operations of 1010 may be performed according to the methods described herein. In some examples, aspects of the operations of 1010 may be performed by an environment determining component as described with reference to FIGS. 6 through 8.

At 1015, the application server may deploy the application to the test environment, where the deploying involves deploying a first component of the performance test to a first test artifact in the test environment and deploying a second component of the performance test different from the first component to a second test artifact in the test environment. The operations of 1015 may be performed according to the methods described herein. In some examples, aspects of the operations of 1015 may be performed by a test deployment component as described with reference to FIGS. 6 through 8.

At 1020, the application server may execute the performance test to obtain a result set. The operations of 1020 may be performed according to the methods described herein. In some examples, aspects of the operations of 1020 may be performed by a test execution component as described with reference to FIGS. 6 through 8.

At 1025, the application server may perform a first isolated execution of the first component using the first test artifact and a second isolated execution of the second component using the second test artifact based on the set of test parameters. The operations of 1025 may be performed according to the methods described herein. In some examples, aspects of the operations of 1025 may be performed by an isolated execution component as described with reference to FIGS. 6 through 8.

At 1030, the application server may orchestrate results across the first test artifact and the second test artifact to obtain the result set. The operations of 1030 may be performed according to the methods described herein. In some examples, aspects of the operations of 1030 may be performed by an orchestration component as described with reference to FIGS. 6 through 8.

At 1035, the application server may determine, by the execution engine, a second test environment for running the performance test different from the test environment. The operations of 1035 may be performed according to the methods described herein. In some examples, aspects of the operations of 1035 may be performed by an environment determining component as described with reference to FIGS. 6 through 8.

At 1040, the application server may deploy the application to the second test environment. The operations of 1040 may be performed according to the methods described herein. In some examples, aspects of the operations of 1040 may be performed by a test deployment component as described with reference to FIGS. 6 through 8.

At 1045, the application server may execute the performance test for the application at the second test environment based on the set of test parameters to obtain a second result set. The operations of 1045 may be performed according to the methods described herein. In some examples, aspects of the operations of 1045 may be performed by a test execution component as described with reference to FIGS. 6 through 8.

Figure 11:
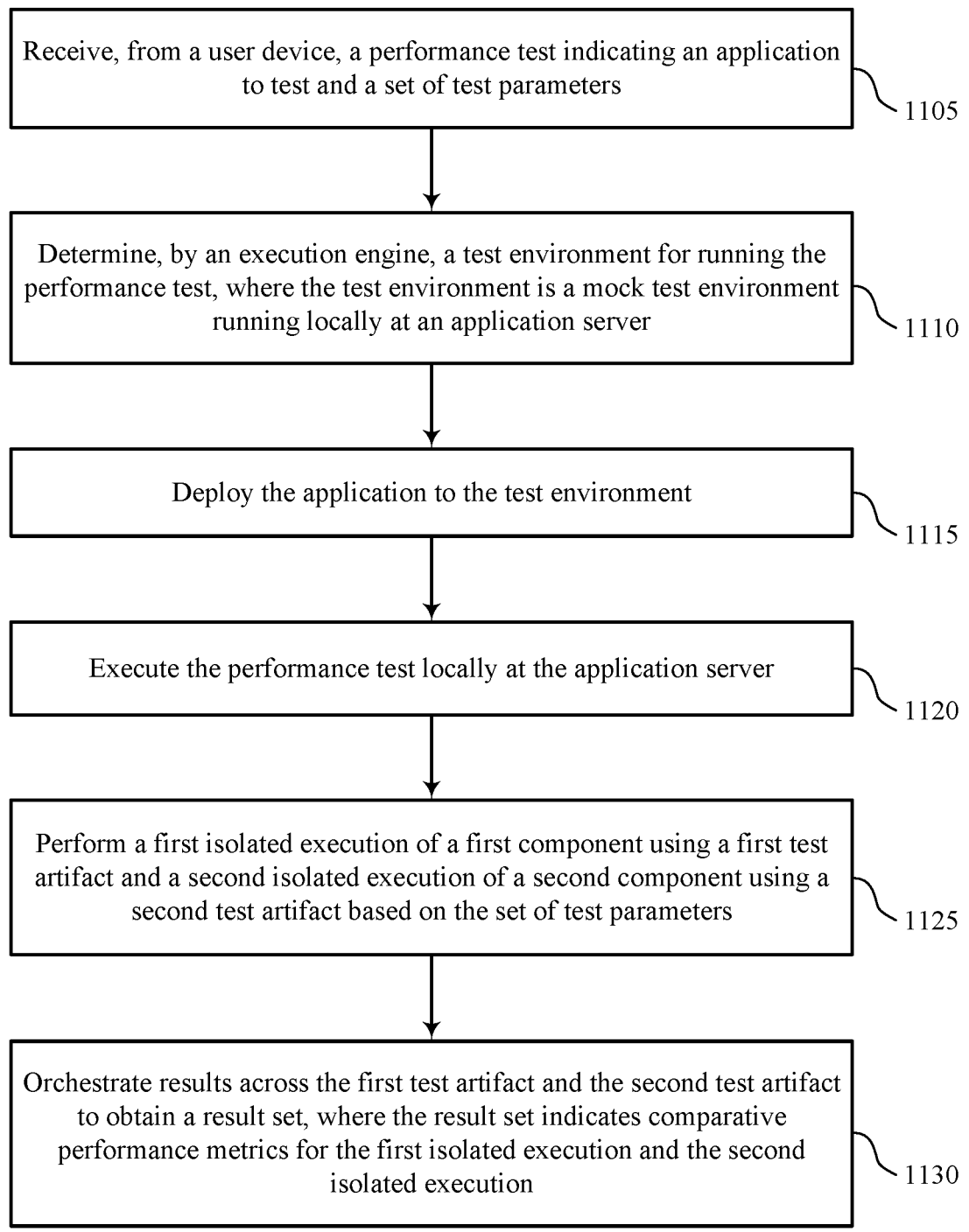

FIG. 11 shows a flowchart illustrating a method 1100 that supports orchestration for automated performance testing in accordance with aspects of the present disclosure. The operations of method 1100 may be implemented by an application server or its components as described herein. For example, the operations of method 1100 may be performed by a test manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1105, the application server may receive, from a user device, a performance test indicating an application to test and a set of test parameters. The operations of 1105 may be performed according to the methods described herein. In some examples, aspects of the operations of 1105 may be performed by a test receiving component as described with reference to FIGS. 6 through 8.

At 1110, the application server may determine, by an execution engine, a test environment for running the performance test. In some examples, the test environment may be an example of a mock test environment running locally at the application server. The operations of 1110 may be performed according to the methods described herein. In some examples, aspects of the operations of 1110 may be performed by an environment determining component as described with reference to FIGS. 6 through 8.

At 1115, the application server may deploy the application to the test environment (e.g., locally at the application server). The deploying may involve deploying a first component of the performance test to a first test artifact in the test environment and deploying a second component of the performance test different from the first component to a second test artifact in the test environment. The operations of 1115 may be performed according to the methods described herein. In some examples, aspects of the operations of 1115 may be performed by a test deployment component as described with reference to FIGS. 6 through 8.

At 1120, the application server may execute the performance test locally at the application server to obtain a result set. The operations of 1120 may be performed according to the methods described herein. In some examples, aspects of the operations of 1120 may be performed by a test execution component as described with reference to FIGS. 6 through 8.

At 1125, the application server may perform a first isolated execution of the first component using the first test artifact and a second isolated execution of the second component using the second test artifact based on the set of test parameters. The operations of 1125 may be performed according to the methods described herein. In some examples, aspects of the operations of 1125 may be performed by an isolated execution component as described with reference to FIGS. 6 through 8.

At 1130, the application server may orchestrate results across the first test artifact and the second test artifact to obtain the result set. In some examples, the result set may indicate comparative performance metrics for the first isolated execution and the second isolated execution. The operations of 1130 may be performed according to the methods described herein. In some examples, aspects of the operations of 1130 may be performed by an orchestration component as described with reference to FIGS. 6 through 8.

A method for managing performance tests is described. The method may include receiving, from a user device, a performance test indicating an application to test and a set of test parameters, determining, by an execution engine, a test environment for running the performance test, and deploying the application to the test environment, where the deploying includes deploying a first component of the performance test to a first test artifact in the test environment and deploying a second component of the performance test different from the first component to a second test artifact in the test environment. The method may further include executing the performance test to obtain a result set, where the executing includes performing a first isolated execution of the first component using the first test artifact and a second isolated execution of the second component using the second test artifact based on the set of test parameters and orchestrating results across the first test artifact and the second test artifact to obtain the result set.

An apparatus for managing performance tests is described. The apparatus may include a processor, memory coupled with the processor, and instructions stored in the memory. The instructions may be executable by the processor to cause the apparatus to receive, from a user device, a performance test indicating an application to test and a set of test parameters, determine, by an execution engine, a test environment for running the performance test, and deploy the application to the test environment, where the deploying includes deploying a first component of the performance test to a first test artifact in the test environment and deploying a second component of the performance test different from the first component to a second test artifact in the test environment. The instructions may be further executable by the processor to cause the apparatus to execute the performance test to obtain a result set, where the instructions to execute the performance test are further executable by the processor to cause the apparatus to perform a first isolated execution of the first component using the first test artifact and a second isolated execution of the second component using the second test artifact based on the set of test parameters and orchestrate results across the first test artifact and the second test artifact to obtain the result set.

Another apparatus for managing performance tests is described. The apparatus may include means for receiving, from a user device, a performance test indicating an application to test and a set of test parameters, means for determining, by an execution engine, a test environment for running the performance test, and means for deploying the application to the test environment, where the deploying includes deploying a first component of the performance test to a first test artifact in the test environment and deploying a second component of the performance test different from the first component to a second test artifact in the test environment. The apparatus may further include means for executing the performance test to obtain a result set, where the executing includes means for performing a first isolated execution of the first component using the first test artifact and a second isolated execution of the second component using the second test artifact based on the set of test parameters and means for orchestrating results across the first test artifact and the second test artifact to obtain the result set.

A non-transitory computer-readable medium storing code for managing performance tests is described. The code may include instructions executable by a processor to receive, from a user device, a performance test indicating an application to test and a set of test parameters, determine, by an execution engine, a test environment for running the performance test, and deploy the application to the test environment, where the deploying includes deploying a first component of the performance test to a first test artifact in the test environment and deploying a second component of the performance test different from the first component to a second test artifact in the test environment. The code may further include instructions executable by a processor to execute the performance test to obtain a result set, where the instructions to execute the performance test are further executable by the processor to perform a first isolated execution of the first component using the first test artifact and a second isolated execution of the second component using the second test artifact based on the set of test parameters and orchestrate results across the first test artifact and the second test artifact to obtain the result set.

Some examples of the method, apparatuses, and non-transitory computer-readable medium described herein may further include operations, features, means, or instructions for determining, by the execution engine, a second test environment for running the performance test different from the test environment, deploying the application to the second test environment, and executing the performance test for the application at the second test environment based on the set of test parameters to obtain a second result set.

Some examples of the method, apparatuses, and non-transitory computer-readable medium described herein may further include operations, features, means, or instructions for receiving a user input indicating a first test environment for running the performance test, where the test environment includes either the first test environment or a mock implementation of the first test environment, and the determining further includes determining, by the execution engine, whether to run the performance test at the first test environment or the mock implementation of the first test environment based on a set of available APIs, a user authorization, a processing overhead threshold, the set of test parameters, or a combination thereof.

In some examples of the method, apparatuses, and non-transitory computer-readable medium described herein, the test environment includes a mock test environment running locally at an application server, and the performance test may be executed locally at the application server.

In some examples of the method, apparatuses, and non-transitory computer-readable medium described herein, the result set indicates comparative performance metrics for the first isolated execution and the second isolated execution.

In some examples of the method, apparatuses, and non-transitory computer-readable medium described herein, deploying the application further may include operations, features, means, or instructions for sending the first component to the first test artifact via a first API and sending the second component to the second test artifact via a second API.

Some examples of the method, apparatuses, and non-transitory computer-readable medium described herein may further include operations, features, means, or instructions for creating a session for running the performance test and spinning up a set of machines for the session, where the set of machines includes at least the first test artifact and the second test artifact.

Some examples of the method, apparatuses, and non-transitory computer-readable medium described herein may further include operations, features, means, or instructions for activating a session API based on creating the session, where the results may be orchestrated across the first test artifact and the second test artifact using the session API.

Some examples of the method, apparatuses, and non-transitory computer-readable medium described herein may further include operations, features, means, or instructions for creating a session token based on creating the session, where the performance test may be executed based on the session token, and deleting the session token based on obtaining the result set.

In some examples of the method, apparatuses, and non-transitory computer-readable medium described herein, the deploying may include operations, features, means, or instructions for deploying, in a first deployment step, the first component of the performance test to the first test artifact, orchestrating information sharing from the deployed first component to a second deployment step, where the second component of the performance test, the second test artifact, or both depend on at least a portion of the information, and deploying, in the second deployment step, the second component of the performance test to the second test artifact based on the portion of the information.

In some examples of the method, apparatuses, and non-transitory computer-readable medium described herein, executing the performance test may involve a first execution of the performance test, and some examples of the method, apparatuses, and non-transitory computer-readable medium described herein may further include operations, features, means, or instructions for executing the performance test for a second execution of the performance test and tracking a performance regression metric, a performance improvement metric, or both based on the first execution of the performance test and the second execution of the performance test.

In some examples of the method, apparatuses, and non-transitory computer-readable medium described herein, the performance test may be executed based on a schedule, a testing periodicity, a testing queue, or a combination thereof.

Some examples of the method, apparatuses, and non-transitory computer-readable medium described herein may further include operations, features, means, or instructions for receiving a user input defining the first test artifact and publishing the first test artifact based on the user input, where deploying the first component of the performance test to the first test artifact may be based on publishing the first test artifact.

Some examples of the method, apparatuses, and non-transitory computer-readable medium described herein may further include operations, features, means, or instructions for storing, at a database, the result set and sending, for display in a user interface of a user device, at least a portion of the result set.

Some examples of the method, apparatuses, and non-transitory computer-readable medium described herein may further include operations, features, means, or instructions for identifying a configuration file, where the test environment may be determined for running the performance test at execution time based on the configuration file.

In some examples of the method, apparatuses, and non-transitory computer-readable medium described herein, the set of test parameters includes one or more threads, a runtime version, one or more policies, one or more batch files, identification information, a success criterion, one or more labels, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing performance tests, comprising:
   receiving, from a user device, a performance test indicating an application to test and a set of test parameters;
   determining, by an execution engine, a test environment for running the performance test;
   providing an application programming interface (API) for creating the test environment for a session based at least in part on the set of test parameters;
   deploying the application to the test environment, wherein the deploying comprises deploying the application to one or more isolated components within the test environment based at least in part on the set of test parameters;
   executing the performance test to obtain a set of orchestrated results indicating performance of the one or more isolated components for the session based at least in part on the deployed application; and
   providing the set of orchestrated results to the user device.

2. The method of claim 1, wherein executing the performance test comprises:
   performing a load test to validate the performance of the application for a load indicated by the set of test parameters.

3. The method of claim 1, wherein executing the performance test comprises:
   performing benchmarking to determine a benchmark associated with the application based at least in part on the set of test parameters.

4. The method of claim 1, wherein the set of orchestrated results indicate support for infrastructure scaling of the application.

5. The method of claim 1, further comprising:
   determining a performance bottleneck based at least in part on the set of orchestrated results; and
   modifying the application to improve the performance bottleneck.

6. The method of claim 1, wherein executing the performance test comprises:
   executing the performance test across the one or more isolated components using an orchestration server; and
   obtaining the set of orchestrated results from the orchestration server.

7. The method of claim 1, wherein the set of test parameters configures a test target, a quantity of concurrent threads, or both for the performance test.

8. The method of claim 1, further comprising:
   receiving, from a second user device, an update to the performance test; and modifying the performance test based at least in part on the update, wherein the deploying is based at least in part on the modified performance test.

9. An apparatus for managing performance tests, comprising:
a processor;
memory coupled with the processor; and
instructions stored in the memory and executable by the processor to cause the apparatus to:
receive, from a user device, a performance test indicating an application to test and a set of test parameters;
determine, by an execution engine, a test environment for running the performance test;
provide an application programming interface (API) for creating the test environment for a session based at least in part on the set of test parameters;
deploy the application to the test environment, wherein the deploying comprises deploying the application to one or more isolated components within the test environment based at least in part on the set of test parameters;
execute the performance test to obtain a set of orchestrated results indicating performance of the one or more isolated components for the session based at least in part on the deployed application; and
provide the set of orchestrated results to the user device.

10. The apparatus of claim 9, wherein the instructions executable by the processor to cause the apparatus to execute the performance test are executable by the processor to cause the apparatus to:
perform a load test to validate the performance of the application for a load indicated by the set of test parameters.

11. The apparatus of claim 9, wherein the instructions executable by the processor to cause the apparatus to execute the performance test are executable by the processor to cause the apparatus to:
perform benchmarking to determine a benchmark associated with the application based at least in part on the set of test parameters.

12. The apparatus of claim 9, wherein the instructions are further executable by the processor to cause the apparatus to:
determine a performance bottleneck based at least in part on the set of orchestrated results; and
modify the application to improve the performance bottleneck.

13. The apparatus of claim 9, wherein the instructions executable by the processor to cause the apparatus to execute the performance test are executable by the processor to cause the apparatus to:
execute the performance test across the one or more isolated components using an orchestration server; and
obtain the set of orchestrated results from the orchestration server.

14. The apparatus of claim 9, wherein the instructions are further executable by the processor to cause the apparatus to:

receive, from a second user device, an update to the performance test; and
modify the performance test based at least in part on the update, wherein the deploying is based at least in part on the modified performance test.

15. A non-transitory computer-readable medium storing code for managing performance tests, the code comprising instructions executable by a processor to:
receive, from a user device, a performance test indicating an application to test and a set of test parameters;
determine, by an execution engine, a test environment for running the performance test;
provide an application programming interface (API) for creating the test environment for a session based at least in part on the set of test parameters;
deploy the application to the test environment, wherein the deploying comprises deploying the application to one or more isolated components within the test environment based at least in part on the set of test parameters;
execute the performance test to obtain a set of orchestrated results indicating performance of the one or more isolated components for the session based at least in part on the deployed application; and
provide the set of orchestrated results to the user device.

16. The non-transitory computer-readable medium of claim 15, wherein the instructions executable to execute the performance test are executable to:
perform a load test to validate the performance of the application for a load indicated by the set of test parameters.

17. The non-transitory computer-readable medium of claim 15, wherein the instructions executable to execute the performance test are executable to:
perform benchmarking to determine a benchmark associated with the application based at least in part on the set of test parameters.

18. The non-transitory computer-readable medium of claim 15, wherein the instructions are further executable to:
determine a performance bottleneck based at least in part on the set of orchestrated results; and
modify the application to improve the performance bottleneck.

19. The non-transitory computer-readable medium of claim 15, wherein the instructions executable to execute the performance test are executable to:
execute the performance test across the one or more isolated components using an orchestration server; and
obtain the set of orchestrated results from the orchestration server.

20. The non-transitory computer-readable medium of claim 15, wherein the instructions are further executable to:
receive, from a second user device, an update to the performance test; and
modify the performance test based at least in part on the update, wherein the deploying is based at least in part on the modified performance test.

* * * * *